US006763097B1

(12) United States Patent
Vitenberg

(10) Patent No.: US 6,763,097 B1
(45) Date of Patent: Jul. 13, 2004

(54) SOURCE ADAPTIVE DIGITAL SUBSCRIBER LINE AND METHOD

(75) Inventor: Roman Vitenberg, Holon (IL)

(73) Assignee: Coppergate Communications Ltd., Tel-Aviv (IL)

( * ) Notice: Subject to any disclaimer, the term of this patent is extended or adjusted under 35 U.S.C. 154(b) by 0 days.

(21) Appl. No.: 09/720,724

(22) PCT Filed: Jun. 24, 1999

(86) PCT No.: PCT/IL00/00349

§ 371 (c)(1),
(2), (4) Date: Apr. 12, 2001

(87) PCT Pub. No.: WO00/02335

PCT Pub. Date: Jan. 13, 2000

(51) Int. Cl.[7] ............................................. H04M 11/00
(52) U.S. Cl. ............................. 379/93.31; 379/93.28; 379/93.08; 379/93.14
(58) Field of Search .......................... 379/93.08, 93.28, 379/93.31, 90.01, 93.01; 375/222

(56) References Cited

U.S. PATENT DOCUMENTS

| | | | |
|---|---|---|---|
| 5,751,701 A | 5/1998 | Langberg et al. | |
| 5,898,761 A | 4/1999 | McHale et al. | |
| 5,978,381 A | 11/1999 | Perlman et al. | |
| 5,991,311 A | 11/1999 | Long et al. | |
| 6,002,682 A | 12/1999 | Bellenger et al. | |
| 6,049,553 A | 4/2000 | Stein | |
| 6,473,438 B1 * | 10/2002 | Cioffi et al. | 370/468 |
| 6,498,806 B1 * | 12/2002 | Davis | 375/222 |

* cited by examiner

*Primary Examiner*—Stella Woo
(74) *Attorney, Agent, or Firm*—AlphaPatent Associates Ltd.; Daniel J. Swirsky

(57) ABSTRACT

A communication system includes a plurality of subscribers having a telephone set and different types of home modems coupled using twisted pairs to a local server that includes a plurality of downstream repeaters, a central office coupled to a local server using twisted pair subscriber lines. The central office includes a telephone switch that provides telephone service to the subscribers and a concentrator that connects a plurality of upstream repeaters with a number of office modems that provide data service to the subscriber. A communication system uses CAP or DMT line signals with time division. The line signal transmits with different time framing. Every subscriber line can work in one of three operation modes Asymmetrical mode, Half-Asymmetrical mode, and Symmetrical mode. An office modem changes the operation mode of subscribers line and downstream/upstream bit rate depending on the type of an information source and the type of the subscriber home modem that is connected to the office modem in the current transmit cycle.

19 Claims, 17 Drawing Sheets

SOURCE ADAPTIVE DIGITAL SUBSCRIBER LINE AND METHOD

TECHNICAL FIELD OF INVENTION

The invention relates in general to data communication, and more particularly to Digital Subscriber Line on telephone cable.

BACKGROUND ART OF THE INVENTION

Digital Subscriber Line (DSL), a new modem technology, converts existing twisted pair telephone lines into access paths for multimedia and high speed data communications. The most successful Asymmetric Digital Subscriber Line (ADSL) transmits more than 6 Mbps to the subscriber, and as much as 640 kbps in both directions. Such rates expand existing access capacity by a factor of 50 or more without new cabling. ADSL can practically transform the existing public information network from one limited to voice, text and low resolution graphics to a powerful, ubiquitous system capable of bringing multimedia, including full motion video, to every home.

An ADSL circuit connects an ADSL modem on each end of a twisted-pair telephone line, creating three information channels—a high speed downstream channel, a medium speed duplex channel and a POTS (Plain Old Telephone Service) channel. The POTS channel is split off from the digital modem by filters, thus guaranteeing uninterrupted POTS, even if ADSL fails. The high-speed downstream channel ranges from 1.5 to 6.1 Mbps, while the duplex rate ranges from 16 to 640 kbps. Downstream data rates depend on a number of factors, including the length of the copper line, its wire gauge, the presence of bridged taps and cross-coupled interference. Line attenuation increases with line length and frequency, and decreases as wire diameter increases. Ignoring bridged taps, ADSL will perform as follows:

| DATA RATE | WIRE SIZE | DISTANCE |
| --- | --- | --- |
| 1.5 MBPS | 0.5 mm | 5.5 km |
| 1.5 MBPS | 0.4 mm | 4.6 km |
| 6.1 Mbps | 0.5 mm | 3.7 km |
| 6.1 Mbps | 0.4 mm | 2.7 km |

One problem is that a real telephone cable has many bridged taps that significantly decrease line length. Another problem is that the flat telephone cable that is used for wiring buildings. Practically these problems render it impossible to provide 6.1 Mbps service to more than 30% of the subscribers. The ADSL home modem is a very complex and expensive apparatus. ADSL Central Office Equipment is very expensive too, because every subscriber line must have its own ADSL office modem. The cost of Central Office ADSL Equipment may be as high as a $300 per subscriber.

The ADSL modem was developed to maximize performance for all available lines. The result is a high performance modem which is not always the most cost-effective solution.

ADSL is not cost-effective due to the following reasons:

DLC's or remote exchanges connect customers located at distances up to 9000 ft from the exchange. Obviously, full high performance ADSL is not need for such short lines. A more economical solution is required.

Current ADSL requires one dedicated central office (C.O.) unit for every customer. This is a very inefficient concept since most of the time only part of the lines are in use so there always are many central office units that are not in use. This inefficiency increases the cost per line and the space needed for ADSL equipment installation. The same service can be provided with a smaller number of units at the C.O. side together with concentration.

ADSL was designed to maximize the data rates on the connection between the customer and the C.O. However, this is usually not the limiting factor. Current Internet communication is limited today by the Internet's back-bone so increased ADSL data rates will not be truly translated to higher end-to-end communication. This is why lately a G.lite standard defined lower targets for the data rates.

ADSL today requires very complex and expensive apparatus at both the C.O. and the customer side.

ADSL was defined to maximize data rates without taking into account the characteristics of the various applications. Some applications require a high downstream bit rate with a very small upstream bit rate e.g. high quality video. Other applications require mid range symmetric data rates like video conferencing. Current ADSL supports maximal uplink and downlink data rates both at the same time. The result is a more complex solution that supports more than what is actually needed.

From another point of view, ADSL is a very redundant system, because ADSL was developed for maximal use of bandwidth for telephone cable without considering information sources characteristics.

Another problem of existing ADSL systems is that only one subscriber computer may be connected to an Internet service at the same time.

About 15 million subscribers in the USA have at least 2 computers at home and since it is impossible to connect every home computer to the Internet by the same twisted pair, the existing ADSL service limitation is a clear drawback.

In accordance with the present invention, the disadvantages and problems associated with the ADSL system have been substantially reduced or eliminated. In particular, Source Adaptive Digital Subscriber Line (SADSL) provides data service to a subscriber in three operation modes: asymmetric mode, half-asymmetric mode and symmetric mode, according to the information source characteristics.

The SADSL uses QAM or DMT modulation for transmitting downstream and upstream data. The symbol rate of the upstream signal is several times less then the symbol rate of the downstream signal. SADSL transmits downstream and upstream data on the same twisted pair of telephone cable using time division modulation (TDM). The transmission frame of SADSL includes a downstream time interval for downstream symbols and an upstream time interval for upstream symbols. The transmission frame of SADSL has a constant duration in any operation mode but downstream and upstream time intervals have a different duration in different operation modes. Symbols of the synchronization word and symbols of the frame control word are added to downstream data symbols. Symbols of the acknowledges word are added to upstream data symbols.

In accordance with the present invention, information sources that may be connected to the subscriber end of SADSL are divided into three groups:

1. Asymmetrical information sources. These sources require a high bit rate downstream and produce only output control signals with a very low bit rate.

|                       | Downstream | Upstream |
|-----------------------|------------|----------|
| This group includes:  |            |          |
| Digital TV            | 6.1 Mbps   | 16 Kbps  |
| Digital HI FI AUDIO   | 1.5 MBPS   | 16 Kbps  |
| Compressed Video      | 1.5 MBPS   | 16 Kbps  |

This group relates to the following situation: the subscriber only receives data from the network server.

2. Half-asymmetrical information sources. These sources receive high bit rate downstream data and produce upstream date with a low bit rate.

|                              | Downstream | Upstream  |
|------------------------------|------------|-----------|
| This group includes Internet | ~1.0 Mbps  | ~100 Kbps |

This group relates to the following situation: the subscriber receives data from a network server and transmits data to a network server.

3. Symmetrical information sources. These sources require the same middle bit rate upstream data and downstream data.

|                                              | Downstream | Upstream |
|----------------------------------------------|------------|----------|
| This group includes Video Conference and Video Phone | 384 kbps   | 384 kbps |

This group relates to the following situation: information can be exchanged between subscribers.

Since the amount of information produced by one subscriber is significantly less than the amount of information produced by a network server, every current and future data service will be related to one of the three groups mentioned above.

The Source Adaptive Digital Subscriber Line may work in one of three operation modes, corresponding to three groups of information sources. Selection of the operation mode is implemented during an initialization phase of the communication session. A communication session means here the cycle of information exchange with the current information source. There are many communication sessions with different sources during one connection to a subscriber.

The SADSL Central Office may support communication of many different home modems located at the same house and in different houses as well. Various upstream and downstream data bit rates can be supported. The initialization process of connection to a subscriber implements selection of data bit rates.

In accordance with the present invention the SADSL communication system includes a plurality of different home modems, located at a plurality of subscriber premises and coupled to a number of different information sources, located at each subscriber premises. Every home modem has an information source analyzer and frame control circuit that changes the transmission frame in accordance with the type of information source connected to the home modem during the current communication session.

The SADSL communication system includes a central office coupled to a plurality of twisted pair subscriber lines. The central office includes a number of central office modems that may operate with any home modem. It should be noted that each C.O. modem could support more than one customer. This functionality is achieved by connecting the C.O. modems to the subscriber lines through an analog concentrator. Every office modem has a home modem type analyzer, a frame control circuit and bit rate adapter. The office modem changes its transmission frame structure and the up/downstream bit rate in accordance with the home modem type and the information source type of the subscriber currently connected to this office modem. The number of office modems is smaller than the number of subscriber lines.

In accordance with one embodiment of the present invention, a communication system comprises a local server. The local server is located at the subscriber end of a plurality of twisted pair subscriber lines, routed to a building or telephone box. The local server includes a plurality of downstream repeaters, coupled to twisted pair subscriber lines. The downstream repeater amplifies the downstream signal and splits the twisted pair subscriber lines into a twisted pair data line and a twisted or flat pair phone line.

In accordance with another embodiment of the present invention, a communication system comprises a central office including a plurality of upstream repeaters coupled to twisted pair subscriber lines. The upstream repeater amplifies the upstream signal and splits each twisted pair subscriber line into a downstream data line, an upstream data line and a twisted or flat pair phone line.

In accordance with another embodiment of the present invention, a communication system comprises multiple line repeaters, coupled to twisted pair subscriber lines. The line repeater amplifies the upstream signal and the downstream signal level. The line repeater includes a frame control circuit that is coupled to a synchronization block. The synchronization block receives the downstream synchronization signal.

In accordance with another embodiment of the present invention, a communication system is comprised of several home modems on the subscriber end, connected to the same twisted pair. Every modem is connected to its own information source. Every home modem has an information source analyzer and a frame control circuit that changes the transmission frame in accordance with the type of information source connected to the home modem, during the current communication session.

Every home modem includes super-frame control circuits that produce different transmission frames for different active home modems.

Control of the super-frame circuits of several home modems is achieved by a Central Office Modem connected to a subscriber line in the current communication session. This means that the Office modem transmits data to one active home modem during, for example, the first transmission frame and to another active home modem, during the second transmission frame. The super-frame includes, for example, 4 transmission frames. Every transmission frame may work in one of three operating modes, according to the connected information source. During the $3^{rd}$ and $4^{th}$ frame transmission of the super-frame, data transmission between active home modems can take place. This means that the SADSL system in this embodiment provides not only DSL service but includes home digital network functionality i.e. the ability to communicate between units located at the customer premises side.

In accordance with another embodiment of the present invention, a communication system comprises, at the subscriber ends one of several home modems and a Digital Telephone Set connected to the same twisted pair. The Digital Telephone Set includes a PCM or ADM codec and a frame control circuit that is coupled to a synchronization block. This block receives a downstream synchronization signal. The voice signal is coded by the PCM or ADM codec and is transmitted during a part of the time interval reserved for control data and synchronization signals.

Important technical advantages of the present invention includes the ability of SADSL to adapt characteristics of home and office modems to characteristics of the current information source. This advantage makes it possible to develop simple home modems that satisfy all the needs of a subscriber.

Another important technical advantage of the present invention includes the ability of SADSL to work with different types of home modems and to supports many different downstream and/upstream data bit rates.

The SADSL communication system may service simultaneously a number of cheap home modems with a low data bit rate and a number of expensive home modems with a high data bit rate.

Another important technical advantage of the present invention includes the ability to amplify and split SADSL line signals using a simple repeater. In the SADSL communication system there is no limitation of cable length and bridged taps. Practically every subscriber of the existing telephone network may be connected to the SADSL communication system.

Another important technical advantage of the present invention includes the ability to give service to a plurality of subscriber home modems with a reduced number of office modems. This advantage makes the SADSL system a more economical solution than the existing ADSL system.

Another important technical advantage of the present invention includes the ability to provide DSL service and Home Digital Networking service by the same home modem simultaneously.

Another important technical advantage of the present invention includes the possibility to provide Digital Telephone Service on the same twisted pair that is used for DSL and POTS service. It should be noted that the present invention is line code independent. The invention relates to modems utilizing base band modulation such as PAM, single carrier modulation such as QAM or CAP or multi carrier modulation such as discrete multi tone (DMT).

One important embodiment of the invention is based on some variant of the current ADSL standard. This variant is the special standard defined for the Japanese market and is known as G.dmt annex C. Some slight variations to this standard can set the basis for the implementation of the present invention.

BRIEF DESCRIPTION OF THE DRAWINGS

For a more complete understanding of the present invention, and for further features and advantages, reference is now made to the following description taken in conjunction with the accompanying drawings, in which.

DETAILED DESCRIPTION OF THE INVENTION

Figure 1:
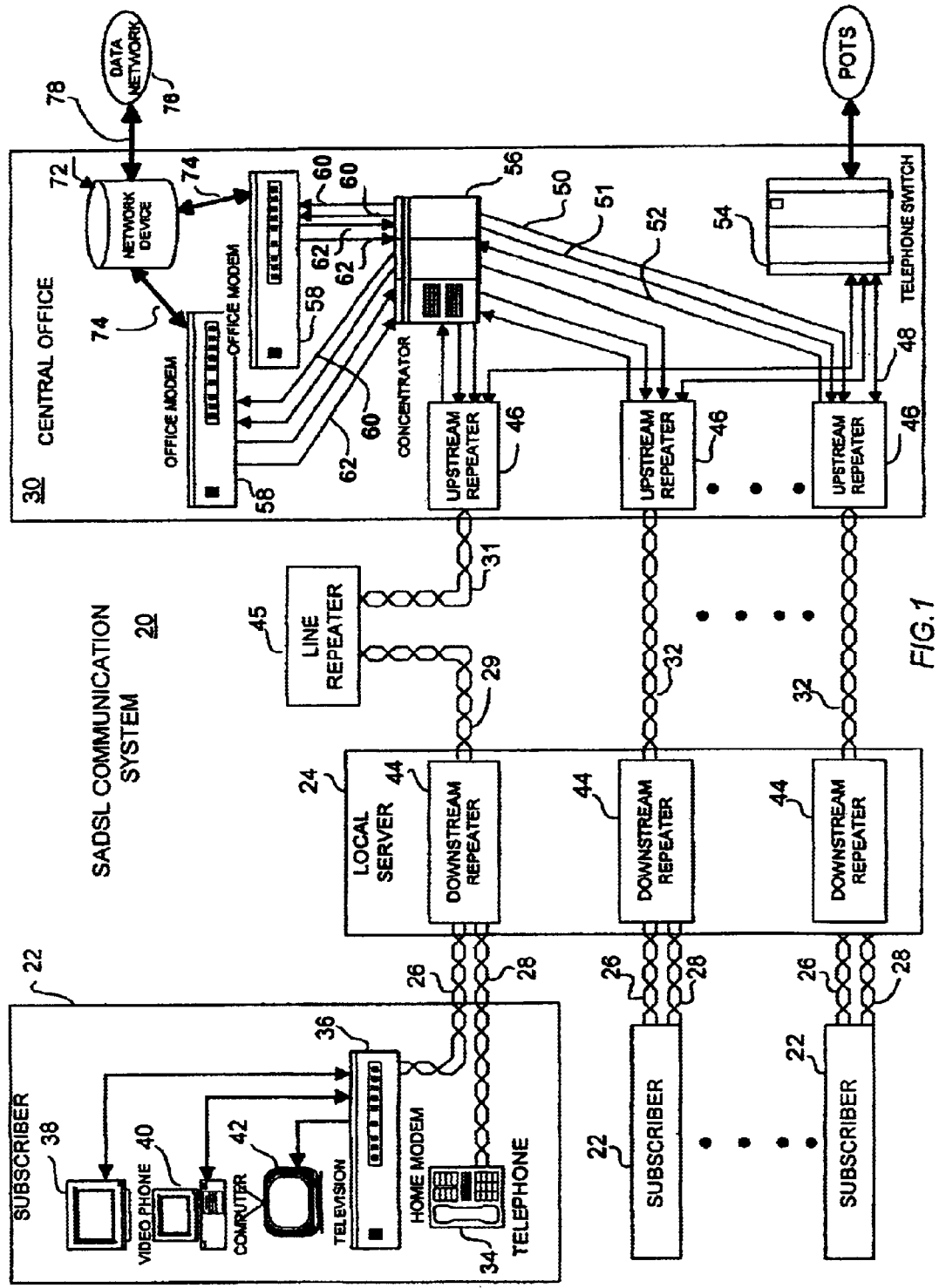
FIG. 1 illustrates a communication system that provides telephone and data service.

FIG. 1 illustrates the communication system 20 that provides both telephone and data service to subscriber 22. Subscriber 22 is coupled to local server 24 using local data line 26 for data communication and local phone line 28 for telephone communication. A local data line 26 and a local phone line 28 may use a twisted pair or a flat pair. A Central office 30 is coupled to local server 24 using twisted pair subscriber lines 32. Subscriber lines 32 support simultaneous telephone and data service.

Subscriber 22 includes telephone 34 and home modem 36. Telephone 34 is coupled to local phone line 28. Home modem 36 is coupled to local data line 26. Telephone 34 is a traditional telephone transceiver, or any other device suitable for allowing voice communication over telephone line 28.

Home modem 36 transmits and receives data in communication system 20 using QAM or DMT modulation signals. Home modem 36 is coupled with three groups of information sources: symmetrical group 38, half-asymmetrical group 40, and asymmetrical group 42.

Symmetrical source 38 has the same middle range bit rate for both the upstream and downstream directions. One example of this source is a Video Phone. Half-asymmetrical source 40 receives a high bit rate downstream and produces upstream with a low bit rate. The example of this source can be a personal computer connected to the Internet. Asymmetrical source 42 receives high bit rate downstream data and produces only output control signals with a very low bit rate. Such a source can be digital TV.

Communication system 20 includes a number of other twisted pair subscriber lines 32 coupled to other subscribers 22 through local server 24. In a typical embodiment, Central Office 30 provides phone and data services to one thousand subscribers 22. A local server 24 provides phone and data service to all subscribers a building and includes a number of downstream repeaters 44 in accordance with the number of subscribers. Downstream Repeater 44 increases the level of the received downstream signal from the central office 30, splits data and phone signals and transmits them to subscriber 22, using local twisted pair 26 for data and local phone line 28 for phone. Line repeater 45 that increases the level of downstream and upstream line signals, may be included for a long subscriber line 29, 31.

Central office 30 includes a number of upstream repeaters 46 coupled to subscriber line 32, a number of office modems 58, concentrator 56, telephone switch 54 and network device 72.

Upstream Repeater 46 increases the level of upstream signal received from subscriber 22, splits data and phone signals into three lines: phone line 48, downstream data line 50 and upstream data line 52.

Phone line 48 is coupled with telephone switch 54. A telephone switch 54 at central office 30 provides plain old telephone system (POTS) service to subscribers 22.

Downstream data line 50 and upstream data line 52 are coupled to concentrator 56 that connects a number of subscribers 22 to a number of office modems 58 using modem up line 60 and modem down line 62.

Concentrator 56 provides electrical connection among a number of subscribers 22 and a number of office modems 58. The number of office modems 58 is less than the number of subscribers 22.

Concentrator 56 performs off-hook detection to determine if subscriber 22 desires data service. The data off-hook detector in concentrator 56 can use one of several methods to determine whether subscriber 22 should be connected to an office modem 58. The off-hook detector in concentrator 56 may monitor direct line current, voltage, electrical tones, data link frames, or any other protocol or data sequencing to determine whether subscriber 22 needs data access.

The following triggers for connecting a subscriber line through the concentrator have special importance for a DMT (ADSL-based) implementation of the present invention:

Detecting the appropriate activation/service request signal coming from the CPE side. A simple detector, designed to detect the unique activation/G.hs signals used to initate the ADSL connection, can do this detection. This trigger is used once, when the ADSL link is first established.

Energy detection on the upstream path. This trigger is used to reconnect an existing link when both sides remain synchronized. Data transfer upon detection of this trigger is almost immediate and does not require a retraining process.

The concentration session includes the following steps:
Detection of some activation signal coming from the CPE side as was previously described.

Allocating a C.O. modem to the active line through the concentrator.

Upon detection of "no activity" on the line e.g. receiving idle cells during some predefined period—temporary disconnection of the line at the C.O. side.

During this temporary disconnection period, synchronization is maintained between the CPE and the C.O. modems. This synchronization eliminates the need for a long retraining process. It is implemented by continued transmission of the pilot tone (DMT implementation) even during the temporary disconnection time.

Upon activity detection, the active line will be reconnected through the concentrator to any available C.O. modem. The data connection will be rebuilt within a short period since the line parameters are already known and stored in the system.

To allow synchronization during the temporary disconnection periods, all C.O. modems connected to the same concentrator use the same clock source. If DMT line code is used, the pilot tone will be generated at the concentrator from one source and will be distributed to all the lines. The C.O. modems might not generate the pilot tone by themselves even during normal operation—instead, the pilot carrier will be always added at the concentrator.

A Central Office 30 includes network device 72 that is coupled with Office Modem 58 by data line 74 and with Data Network 76 by network line 78.

One embodiment of communication system 20 uses QAM or CAP modulation for transmitting upstream and downstream line signals. There are four levels of line signal depending on the necessary bit rate.

a. Level 1 uses QAM 4 modulation for up and downstream.

b. Level 2 uses QAM16 modulation for up and downstream.

c. Level 3 uses QAM 64 modulation for up and downstream d. Level 4 uses QAM256 modulation for up and downstream.

The office modem 58 may operate at four levels of line signals. The current level of office modem 58 line signals depends on the type of home modem 36 that was connected by the subscriber in the current communication cycle. Home modem 36 may be different and may support one or several levels of line signals.

The simplest home modem GRADE 1 supports only Level 1.

Home modem GRADE 2 supports Level 1 and Level 2.

Home modem GRADE 3 supports Level 1, Level 2 and Level 3.

Home modem GRADE 4 supports all four levels of line signals.

Another embodiment of communication system 20 uses DMT modulation for transmission of upstream and downstream data transport cells 90 and QAM modulation for transmission of synchronization word 88, frame control word 89 and acknowledge word 92. Every tone of DMT can be modulated by QAM4, QAM16, QAM64, and QAM256. In accordance with modulation type, there are four corresponding levels of DMT line signals. Communication system 20 has three operation modes in accordance with the information source type that was used by the subscriber for the current transmission session: asymmetrical, half-asymmetrical and symmetrical mode of operation. There are three possible transmission frame structures, depending on the operation mode.

Figure 2:
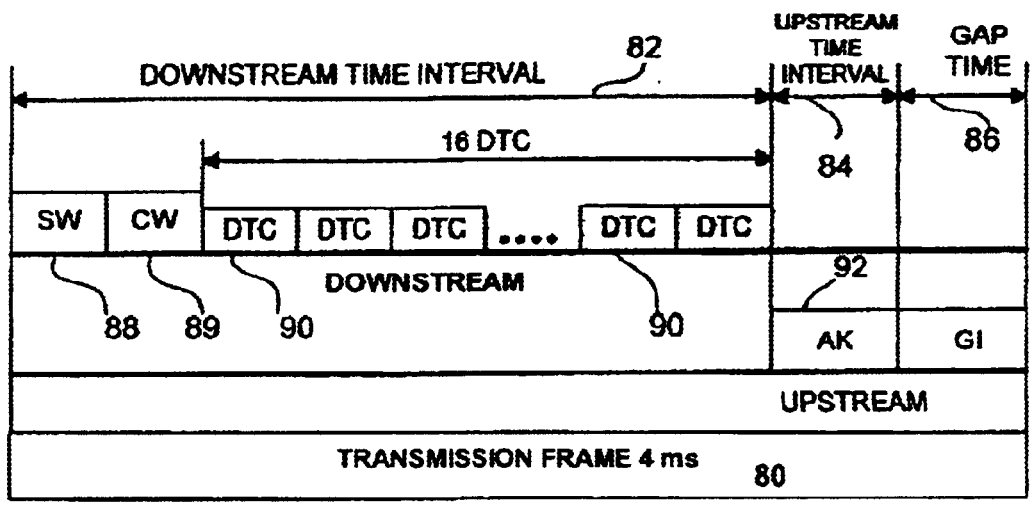
FIG. 2 illustrates a transmission frame structure in asymmetrical mode for QAM SADSL.

FIG. 2 illustrates the transmission frame structure (of QAM home modem GRADE 1) for asymmetrical operation mode in one embodiment of the present invention. Transmission frame 80 has a constant 4 ms duration and includes Downstream Interval 82, Upstream Interval 84 and Gap Interval 86. Downstream Interval 82 includes synchronization word (SW) 88, control word (CW) 89 and 16 data transport cells (DTC) 90 that contain downstream data. Upstream Interval 84 include only acknowledges (AK) 92. Gap Interval (GI) 86 is the guard time for the next transmission frame.

Figure 3:
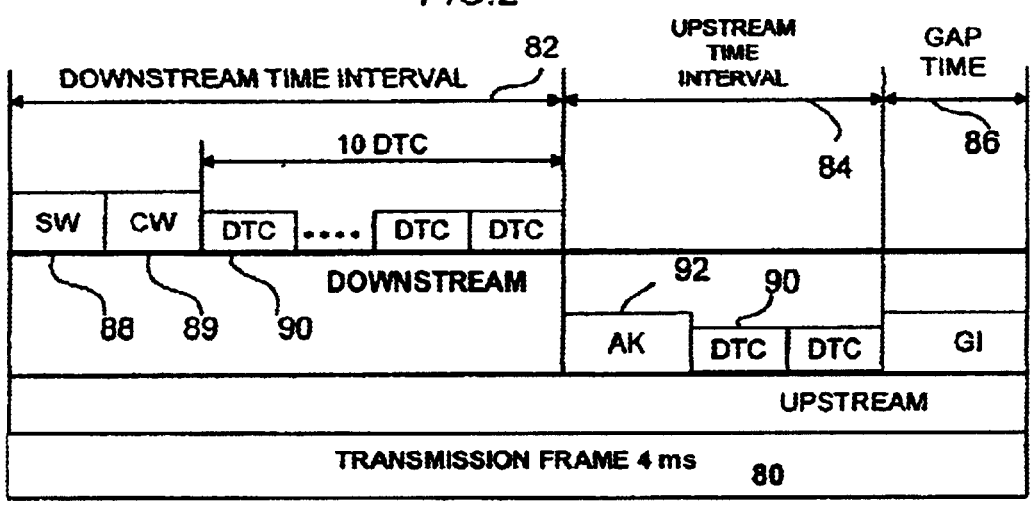
FIG. 3 illustrates a transmission frame structure in half-asymmetrical mode for QAM SADSL.

FIG. 3 illustrates the transmission frame structure (of QAM home modem GRADE 1) for half asymmetrical operation mode in one embodiment of the present invention. In this mode Downstream Interval 82 includes SW 88, CW 89 and 10 DTC 90. Upstream Interval 84 includes AK 92 and 2 DTC 90.

Figure 4:
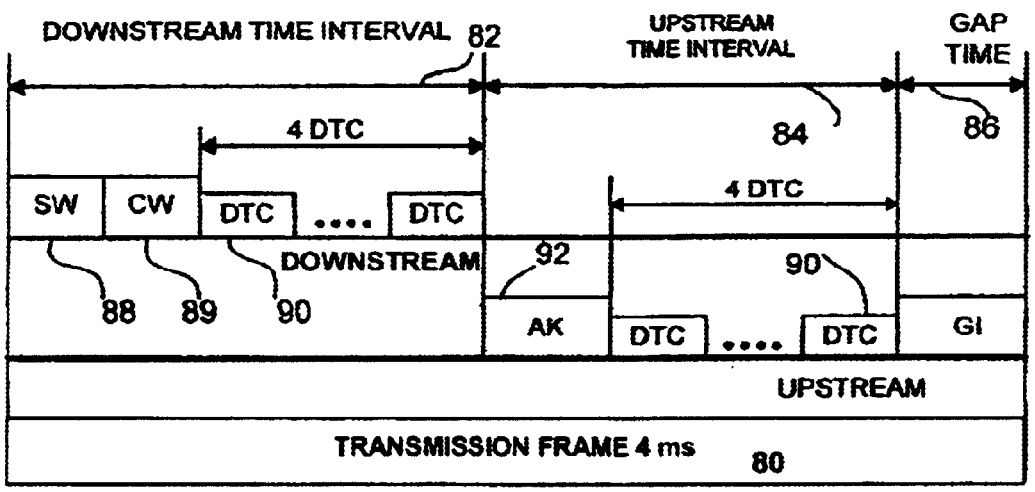
FIG. 4 illustrates a transmission frame structure in symmetrical mode for QAM SADSL.

FIG. 4 illustrates transmission frame structure (of QAM home modem GRADE 1) for symmetrical operation mode in one embodiment of the present invention. In this mode Downstream Interval 82 includes SW 88, CW 89 and 4 DTC 90. Upstream Interval 84 includes AK 92 and 4 DTC 90.

Figure 5:
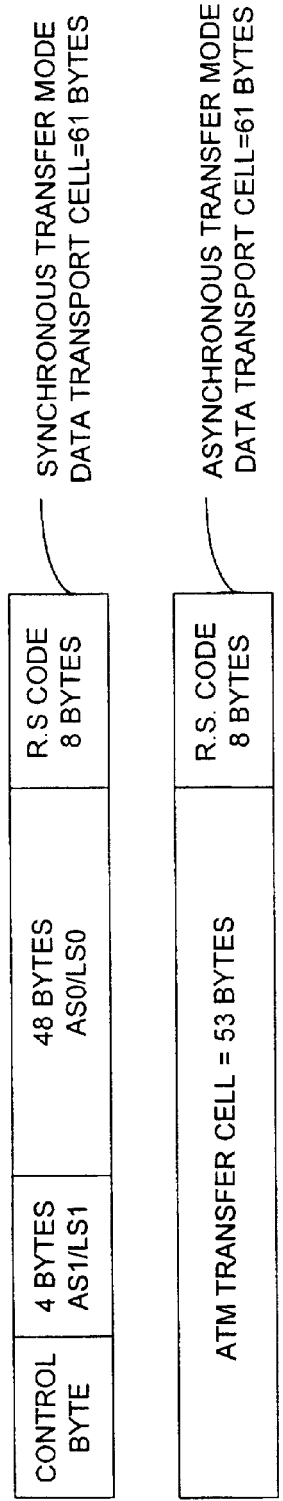
FIG. 5 illustrates a data transport cell structure.

FIG. 5 illustrates data the structure of data transport cell 90. In Synchrony Transfer Mode (STM) DTC 90 supports two downstream data channels, AS0 and AS1, and two upstream data channels, LS0 and LS1. In this mode, DTC 90 includes a control byte, 4 bytes of AS1/LS1 channel, 48 bytes of AS0/LS0 channel and 8 bytes of Reed-Solomon Code. In Asynchronous Transfer Mode (ATM), DTC 90 includes 53 bytes of ATM Cell and 8 bytes of Reed-Solomon Code. Communication system 20 uses the same synchronization word (SW) 88 and different codes for control word 89 and for acknowledge 92 corresponding to the operation mode and the current data bit rate. The Control word (CW) 89 informs every device connected to the subscriber line (Home Modem, Office Modem, repeaters) in which operation mode the system must work for the current transmit frame and which type (GRADE) of Home Modem is connected to the subscriber end.

Frame synchronization word 88, Control word 89 and acknowledge 92 are transmitted with the lowest level of modulation (QAM4) for any Grade of modem. Data Transport Cell 90 is transmitted with QAM4 for Level 1, QAM16 for Level 2, QAM64 for Level 3 and QAM 256 for Level 4.

TABLE 1 shows the number of QAM upstream and downstream DTC 90 in one embodiment of the present invention for different operation modes. This data was calculated for a 4 ms duration of the transmission frame, a 1080 kHz downstream symbol clock and a 360 kHz upstream symbol clock.

TABLE 1

Number of DTC in a QAM SADSL transmission frame.

| MODE | ASYMMETRIC | | HALF ASYMMETRIC | | SYMMETRIC | |
|---|---|---|---|---|---|---|
| MODULATION | UP | DOWN | UP | DOWN | UP | DOWN |
| QAM 4 | 0 | 16 | 2 | 10 | 4 | 4 |
| QAM 16 | 0 | 32 | 4 | 20 | 8 | 8 |
| QAM 64 | 0 | 48 | 6 | 30 | 12 | 12 |
| QAM 256 | 0 | 64 | 8 | 40 | 16 | 16 |

TABLE 2 shows the Transmit Capability of Communication System 20 (in ATM cells) in one embodiment of the present invention. This data was calculated for a 4 ms duration of the transmission frame, a 1080 kHz downstream symbol clock and a 360 kHz upstream symbol clock.

TABLE 2

QAM SADSL System Transmit Capacity in ATM cells/sec.

| MODE | ASYMMETRIC | | HALF ASYMMETRIC | | SYMMETRIC | |
|---|---|---|---|---|---|---|
| MODULATION | UP | DOWN | UP | DOWN | UP | DOWN |
| QAM 4 | 0 | 4000 | 500 | 2500 | 1000 | 1000 |
| QAM 16 | 0 | 8000 | 1000 | 5000 | 2000 | 2000 |
| QAM 64 | 0 | 12000 | 1500 | 7500 | 3000 | 3000 |
| QAM 256 | 0 | 16000 | 2000 | 10000 | 4000 | 4000 |

TABLE 3 shows the Transmit Capability of Communication System 20 (in STM mode) in one embodiment of the present invention. This data was calculated for a 4 ms duration of the transmission frame, a 1080 kHz downstream symbol clock and a 360 kHz upstream symbol clock.

TABLE 3

QAM SADSL System Transmission Capacity (STM) in kbps.

| | | ASYMMETRIC | | HALF ASYMMETRIC | | SYMMETRIC | |
|---|---|---|---|---|---|---|---|
| MODE MODULATION | UP | DOWN AS0 + AS1 | UP LS0 + LS1 | DOWN AS0 + AS1 | UP LS0 + LS1 | DOWN AS0 + AS1 |
| QAM 4 | 0 | 1536 + 128 | 192 + 16 | 960 + 80 | 384 + 32 | 384 + 32 |
| QAM 16 | 0 | 3072 + 256 | 384 + 32 | 1920 + 160 | 768 + 64 | 768 + 64 |
| QAM 64 | 0 | 4608 + 384 | 512 + 48 | 2880 + 240 | 1152 + 96 | 1152 + 96 |
| QAM 256 | 0 | 6144 + 512 | 768 + 64 | 3840 + 320 | 1536 + 128 | 1536 + 128 |

Figure 6:
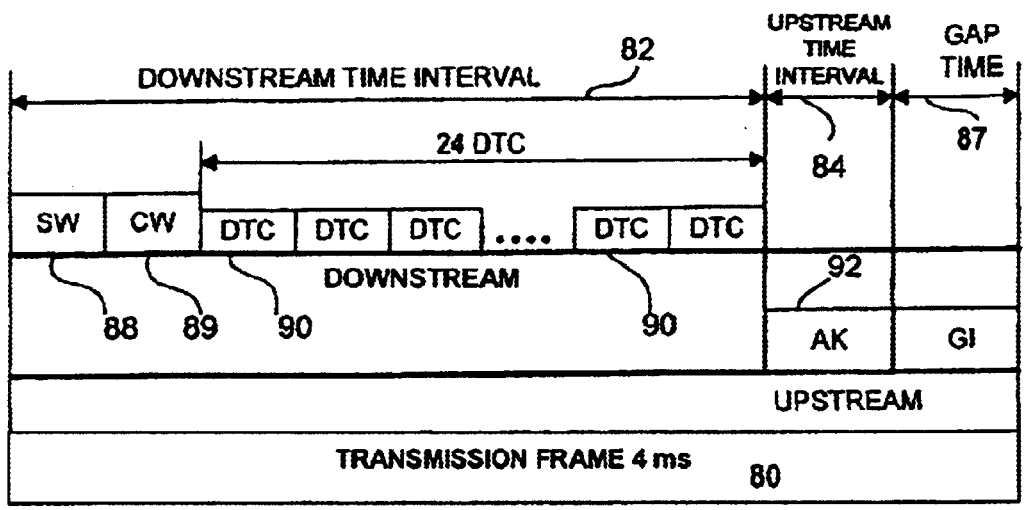
FIG. 6 illustrates a transmission frame structure in asymmetrical transmit mode for DMT SADSL.

FIG. 6 illustrates the transmission frame structure (of DMT home modem GRADE 1) for asymmetrical operation mode in another embodiment of the present invention. Transmission frame 80 has a constant 4 ms duration and includes Downstream Interval 82, Upstream Interval 84 and Gap Interval 86. Downstream Interval 82 includes synchronization word (SW) 88, control word (CW) 89 and 24 data transport cells (DTC) 90 that contain downstream data. Upstream Interval 84 includes only acknowledges (AK) 92. Gap Interval (GI) 86 is used for the guard time for the next transmission frame. Every DTC 90 is coded by DMT modulation that uses 244 tones with QAM4. Every downstream DTC 90 is converted to one 125 µs DMT symbol, every upstream DTC is converted to one 375 µs DMT symbol.

Figure 7:
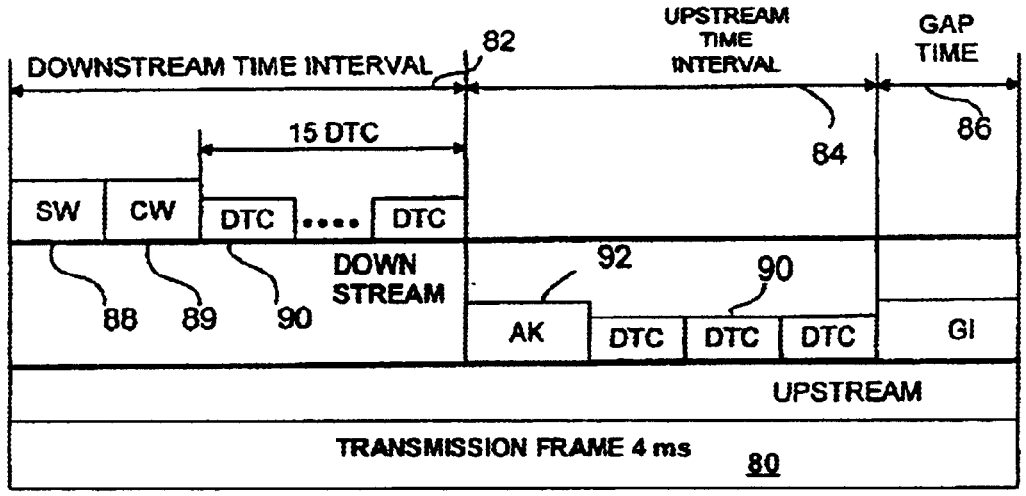
FIG. 7 illustrates a transmission frame structure in half-asymmetrical mode for DMT SADSL.

FIG. 7 illustrates the transmission frame structure (of DMT home modem GRADE 1) for half asymmetrical operation mode in another embodiment of the present invention. In this mode Downstream Interval 82 includes SW 88, CW 89 and 15 DTC 90. Upstream Interval 84 includes AK 92 and 3 DTC 90.

Figure 8:
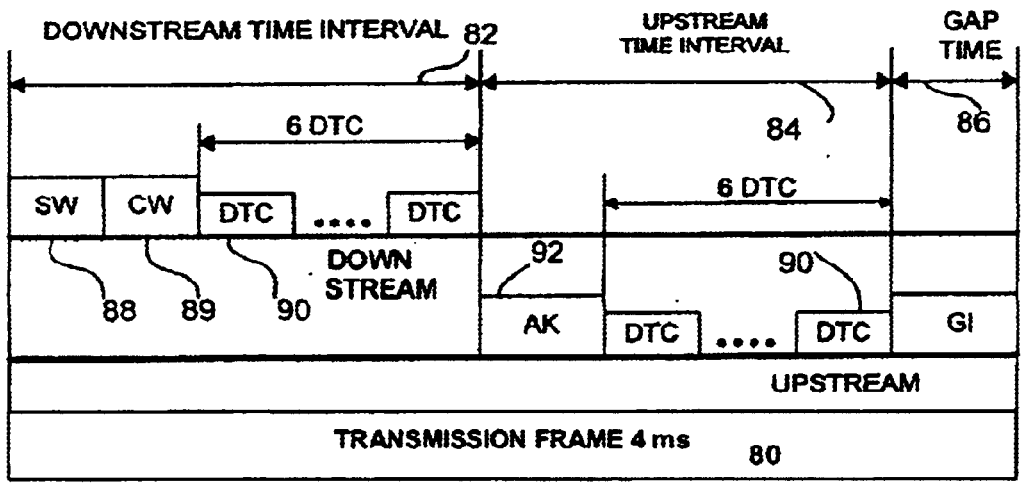
FIG. 8 illustrates a transmission frame structure in symmetrical mode for DMT SADSL.

FIG. 8 illustrates the transmission frame structure (of DMT home modem GRADE 1) for symmetrical operation mode in another embodiment of the present invention. In this mode Downstream Interval 82 includes SW 88, CW 89 and 6 DTC 90. Upstream Interval 84 includes AK 92 and 6 DTC 90.

A Communication system 20 uses the same Frame synchronization word (SW) 88 and different codes for Control Word 89 and acknowledge 92 corresponding to the operation mode and current data bit rate. The Control word (CW) 89 informs every device that is connected to the subscriber line (Home Modem, Office Modem, repeaters) in which operation mode it must work for the current transmission frame and which type (GRADE) of Home Modem is connected to the subscriber end.

Frame synchronization word 88, Control word 89 and acknowledges word 92 are transmitted with QAM4 for any grade of modems. Data Transport Cell 90 is transmitted with DMT that uses 244 tones with QAM4 for Level 1, QAM16 for Level 2, QAM64 for Level 3 and QAM256 for Level 4.

TABLE 4 shows the number of DMT upstream and downstream DTC 90 in another embodiment of the present invention for different operation modes. This data was calculated for a 4 ms duration of the transmission frame.

TABLE 4

Number of DTC in a DMT SADSL transmission

| MODE MODULATION | ASYMMETRIC | | HALF ASYMMETRIC | | SYMMETRIC | |
| --- | --- | --- | --- | --- | --- | --- |
| | UP | DOWN | UP | DOWN | UP | DOWN |
| DMT 4 | 0 | 24 | 3 | 15 | 6 | 6 |
| DMT 16 | 0 | 48 | 6 | 30 | 12 | 12 |
| DMT 64 | 0 | 72 | 9 | 45 | 18 | 18 |
| DMT 256 | 0 | 96 | 12 | 60 | 24 | 24 |

TABLE 5 shows the Transmit Capability of Communication System 20 (in ATM cells) in the DMT embodiment of the present invention. This data was calculated for a 4 ms duration of the transmission frame.

TABLE 5

DMT SADSL System Transmit Capacity in ATM cells/sec.

| MODE MODULATION | ASYMMETRIC | | HALF ASYMMETRIC | | SYMMETRIC | |
| --- | --- | --- | --- | --- | --- | --- |
| | UP | DOWN | UP | DOWN | UP | DOWN |
| DMT 4 | 0 | 6000 | 750 | 3750 | 1500 | 1500 |
| DMT 16 | 0 | 12000 | 1500 | 7500 | 3000 | 3000 |
| DMT 64 | 0 | 18000 | 2250 | 11250 | 4500 | 4500 |
| DMT 256 | 0 | 24000 | 3000 | 15000 | 6000 | 6000 |

TABLE 6 shows the Transmit Capability of Communication System 20 (in STM mode) in the DMT embodiment of the present invention. This data was calculated for a 4 ms duration of the transmission frame.

TABLE 6

DMT SADSL System Transmit Capacity (STM) in Kbps.

| MODE MODULATION | ASYMMETRIC | | HALF ASYMMETRIC | | SYMMETRIC | |
| --- | --- | --- | --- | --- | --- | --- |
| | UP | DOWN AS0 + AS1 | UP LS0 + LS1 | DOWN AS0 + AS1 | UP LS0 + LS1 | DOWN AS0 + AS1 |
| DMT 4 | 0 | 2304 + 192 | 288 + 24 | 1440 + 120 | 576 + 48 | 576 + 48 |
| DMT 16 | 0 | 4608 + 384 | 576 + 48 | 2880 + 240 | 1152 + 96 | 1152 + 96 |
| DMT 64 | 0 | 6912 + 576 | 864 + 72 | 4320 + 360 | 1728 + 144 | 1728 + 144 |
| DMT 256 | 0 | 9216 + 768 | 1152 + 96 | 5760 + 480 | 2304 + 192 | 2304 + 192 |

Figure 9:
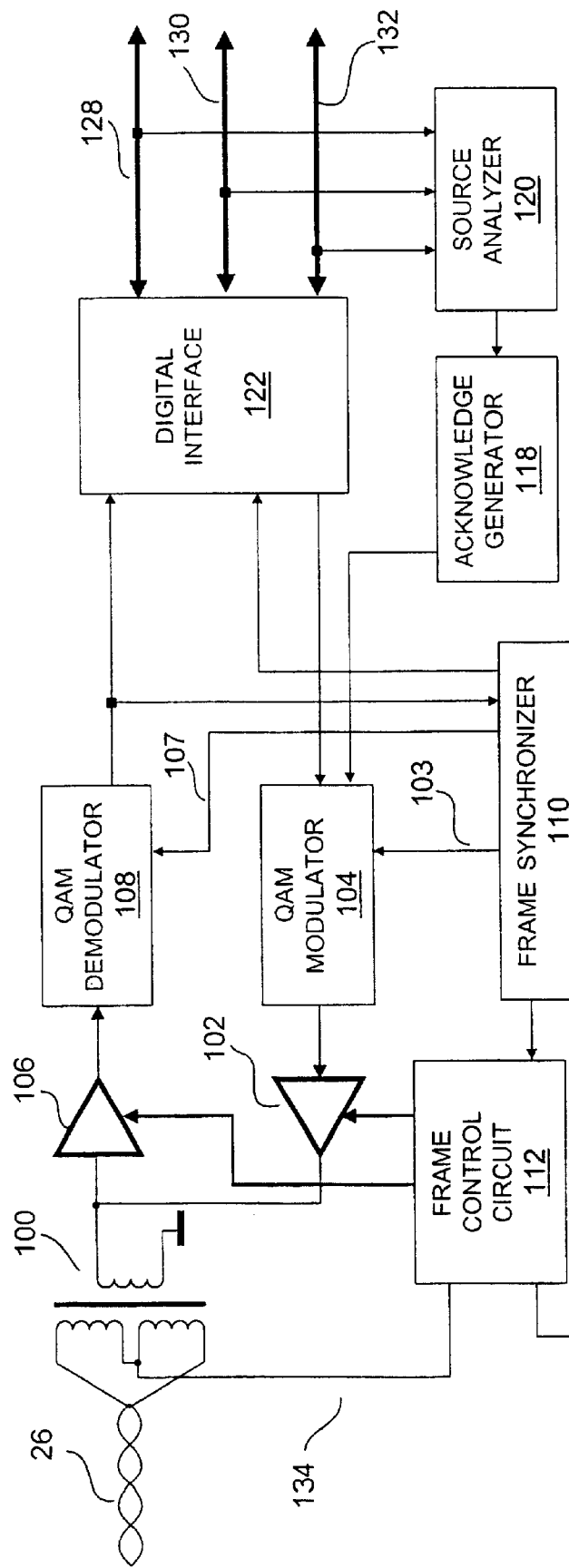
FIG. 9 illustrates in more detail the home modem.

FIG. 9 illustrates in more details home modem 36 in one embodiment of the present invention. The home modem 36 includes line transformer 100 connected to twisted pair 26, upstream amplifier 102 that is coupled to transformer 100 and to QAM modulator 104, downstream amplifier 106 that is coupled to transformer 100 and to QAM demodulator 108, frame synchronizer 110 coupled to QAM demodulator 108 and to frame control circuit 112, digital interface 122, coupled to QAM modulator 104 and to QAM demodulator 108 and information source analyzer 120 coupled to acknowledge generator 118. Information source analyzer 120 and digital interface 122 are coupled by digital line 128 to the symmetrical information source 38, by digital line 130, to half asymmetrical information source 40, by digital line 132, to asymmetrical information source 42. Acknowledge generator 118 is coupled to QAM modulator 104.

The downstream signal received from twisted pair 26 is converted by QAM demodulator 108. The binary sequence of decoded downstream data is transmitted to frame synchronizer 110 and to digital interface 122. The digital interface 122 decodes downstream data transport cells and provides communication with information sources 38, 40, and 42. The digital interface 122 supports many different protocols of exchange, such as PCI bus, ISA bus, or any other suitable technology that provides input/output capability to the information source. The frame synchronizer 110 produces downstream and upstream symbol clocks from the downstream signal, and detects the frame synchronization word 88 and control word 89 transmitted by central office 30.

Frame synchronizer 110 is connected to frame control circuit 112 that changes the transmit frame structure in accordance with FIG. 2, FIG. 3 or FIG. 4 depending on the received control word 89. Frame control circuit 112 turns on/off the Downstream amplifier 106 and upstream amplifier 102 depending on the current operation mode and transmits corresponding control signals to downstream repeater 44, using control line 134 connected to the middle point of the primary winding of transformer 100.

Upstream data is routed from one of the information source lines 128, 130 or 132 to digital interface block 122 that converts the upstream data to transport cells 90. Acknowledge generator 118 adds to transport the cells' data acknowledge word 92. The upstream binary data is converted to QAM line symbols by QAM modulator 104 which is connected to upstream amplifier 102. Upstream amplifier 102 transmits upstream QAM line signal to twisted pair line 26.

Communication system 20 may service simultaneously many different home modems 36 from the simplest Home modem GRADE 1, to the most complex Home Modem, Grade 4. Frame synchronizer 110 of the complex home modem is connected to QAM modulator 104 by control line 103 and to QAM demodulator 108 by control line 107. QAM modulator 104 and QAM demodulator 108 both support QAM4 or QAM16 or QAM64 or QAM256 modulation, according to the current control word 89, received by synchronizer 110.

Figure 10:
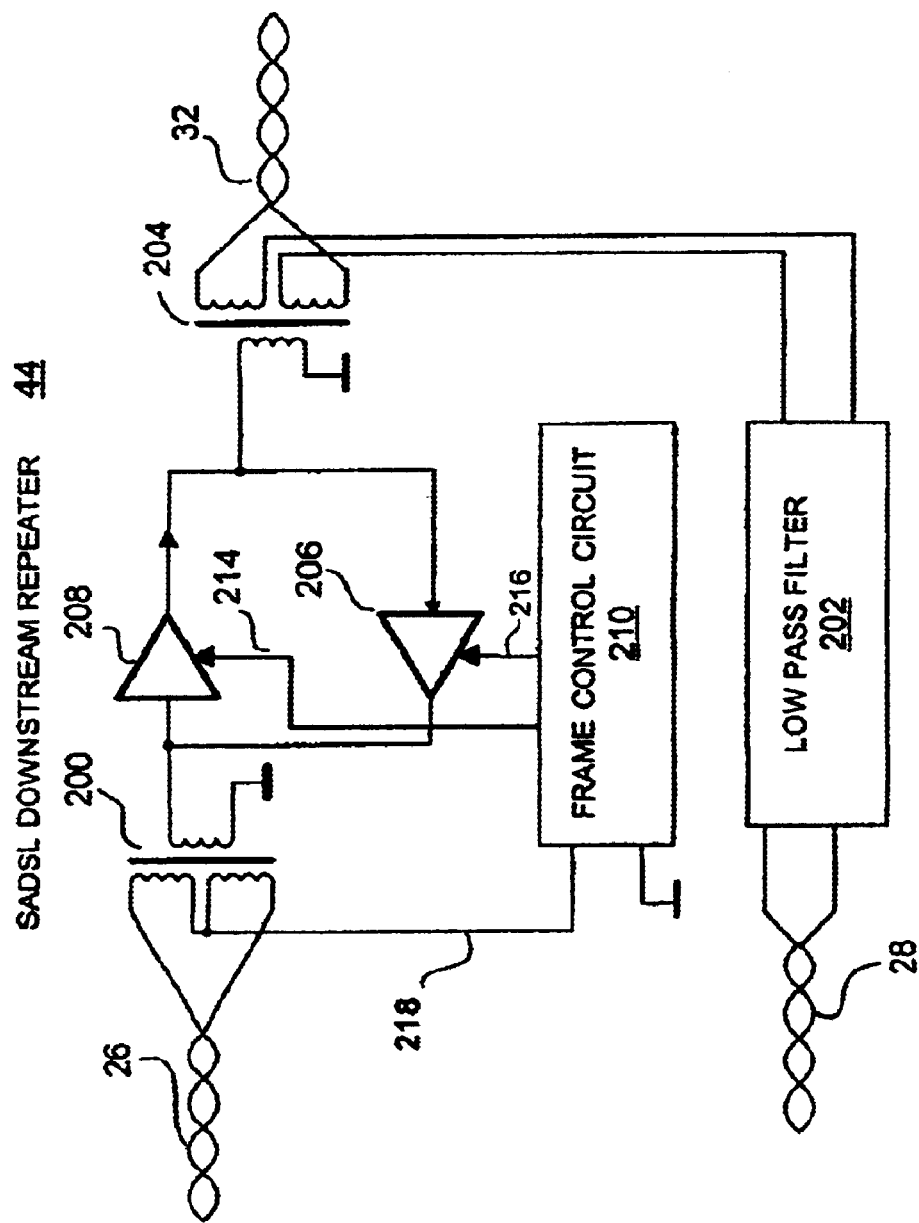
FIG. 10 illustrates in more detail the downstream repeater.

FIG. 10 illustrates in detail a downstream repeater 44. Downstream Repeater 44 includes local transformer 200 that is coupled to local data line 26, to downstream amplifier 206 and to upstream buffer 208. A middle point of the primary winding of transformer 200 is coupled by control line 218 to frame control circuit 210. The frame control circuit 210 is connected to the enable input 214 of upstream buffer 208 and to the enable input 216 of downstream amplifier 206. Low Pass Filter 202 is connected to local phone line 28 and to line transformer 204. Line transformer 204 is coupled to the output of upstream buffer 208, to the input of downstream amplifier 206 and to the twisted pair subscriber line 32. The frame control circuit 210 switches on/off the downstream amplifier 206 and the upstream buffer 208, in accordance with the signal on control line 218. This frame control signal comes from the Home Modem by local data line 26.

Figure 11:
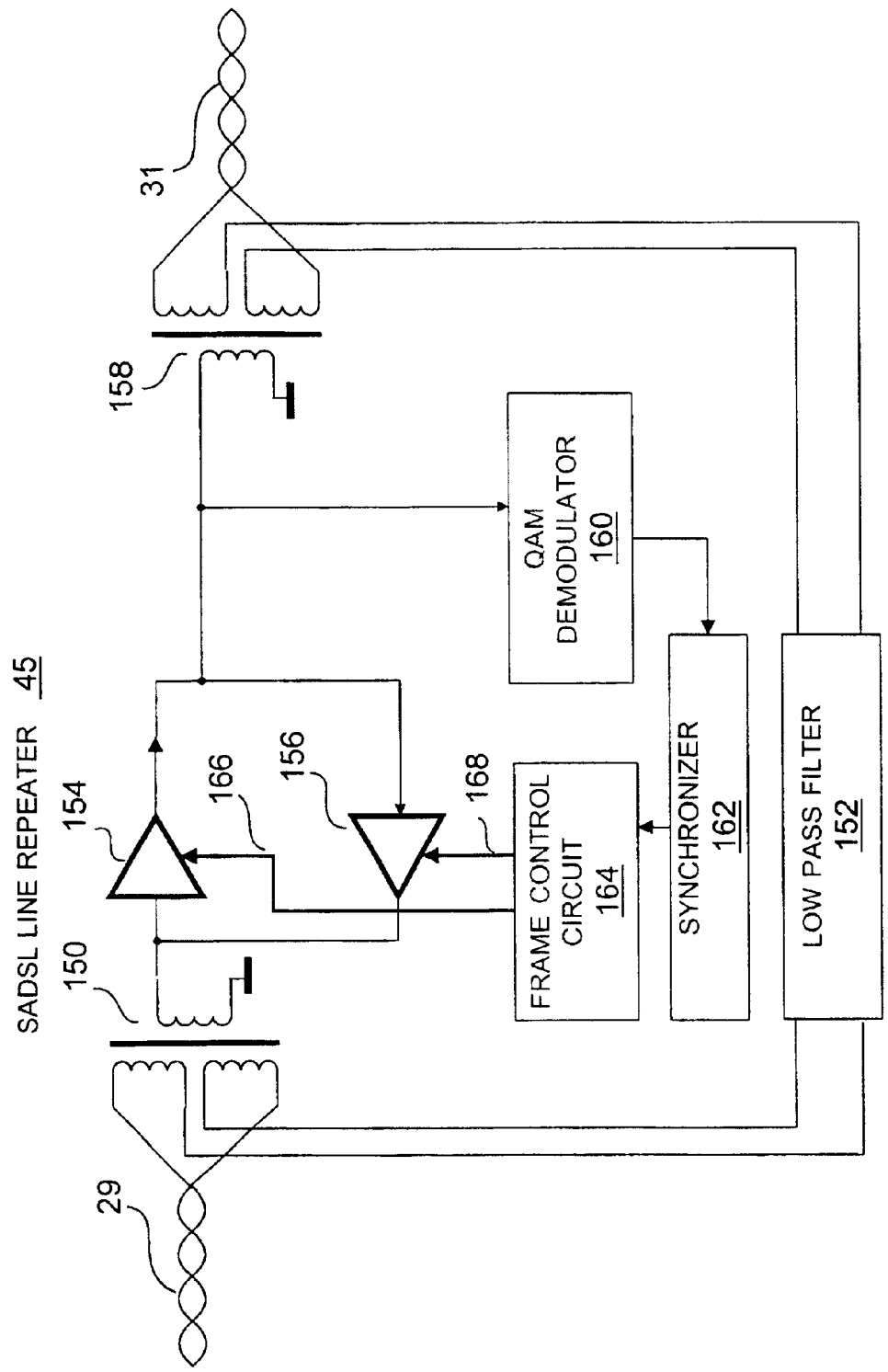
FIG. 11 illustrates in more detail the line repeater.

FIG. 11 illustrates in detail a line repeater 45. The line repeater 45 includes a first transformer 150 that is connected to twisted pair 29 that is routed from the subscriber, to the low pass filter 152, to the input of upstream amplifier 154 and to the output of downstream amplifier 156. A second transformer 158 is connected to twisted pair 31 that is routed from central office 30, to low pass filter 152, to the output of upstream amplifier 154 and to the input of downstream amplifier 156. A QAM demodulator 160 is coupled to the second transformer 158 and to frame synchronizer 162. A frame control circuit 164 is coupled to frame synchronizer 162, to enable input 166 of upstream amplifier 154 and to enable input 168 of downstream amplifier 156. QAM demodulator 160 converts a downstream signal received from twisted pair 31. The binary sequence of decoded downstream data is transmitted to frame synchronizer 162.

The frame synchronizer 162 produces the downstream and upstream symbol clocks, detects the frame synchronization word 88 and the control word 89, transmitted by central office 30.

Frame synchronizer 162 is connected to frame control circuit 164 that changes the transmission frame structure in accordance with FIG. 2, FIG. 3 or FIG. 4 depending on the received control word 89. Frame control circuit 164 turns on/off the downstream amplifier 156 and upstream amplifier 154, depending on the current operation mode.

Figure 12:
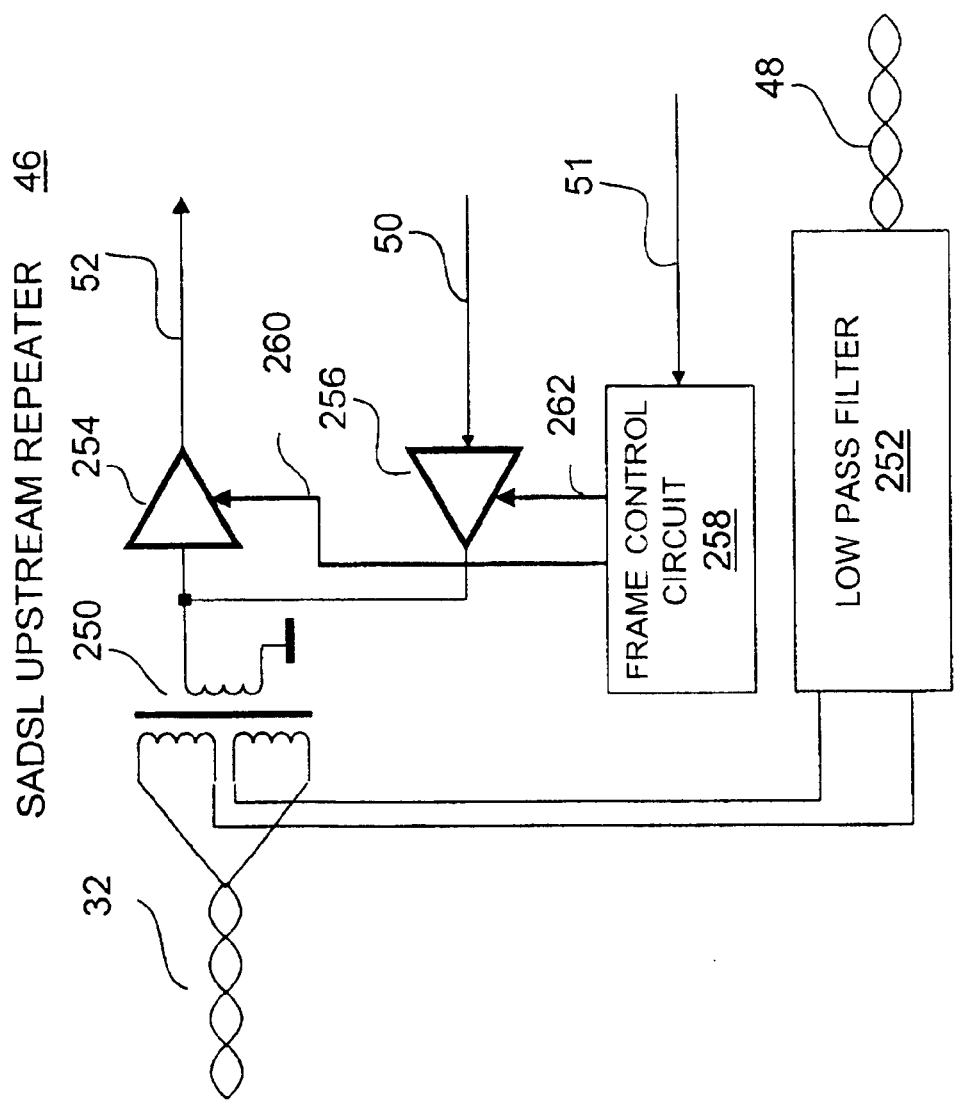
FIG. 12 illustrates in more detail the upstream repeater.

FIG. 12 illustrates in detail an upstream repeater 46. The upstream repeater 46 includes line transformer 250 that is connected to subscriber line 32, low pass filter 252, that is connected to line transformer 250 and to phone line 48, upstream amplifier 254, that is connected to line transformer 250 and to upstream data line 52, downstream buffer 256, that is connected to line transformer 250 and to downstream data line 50 and frame control circuit 258, that is connected to enable input 260 of upstream amplifier 254, to enable input 262 of downstream buffer 256 and to control line 51. The frame control circuit 258 switches on/off the downstream buffer 256 and upstream amplifier 254, in accordance with the frame control signal that transmits from office modem 58 through concentrator 56.

Figure 13:
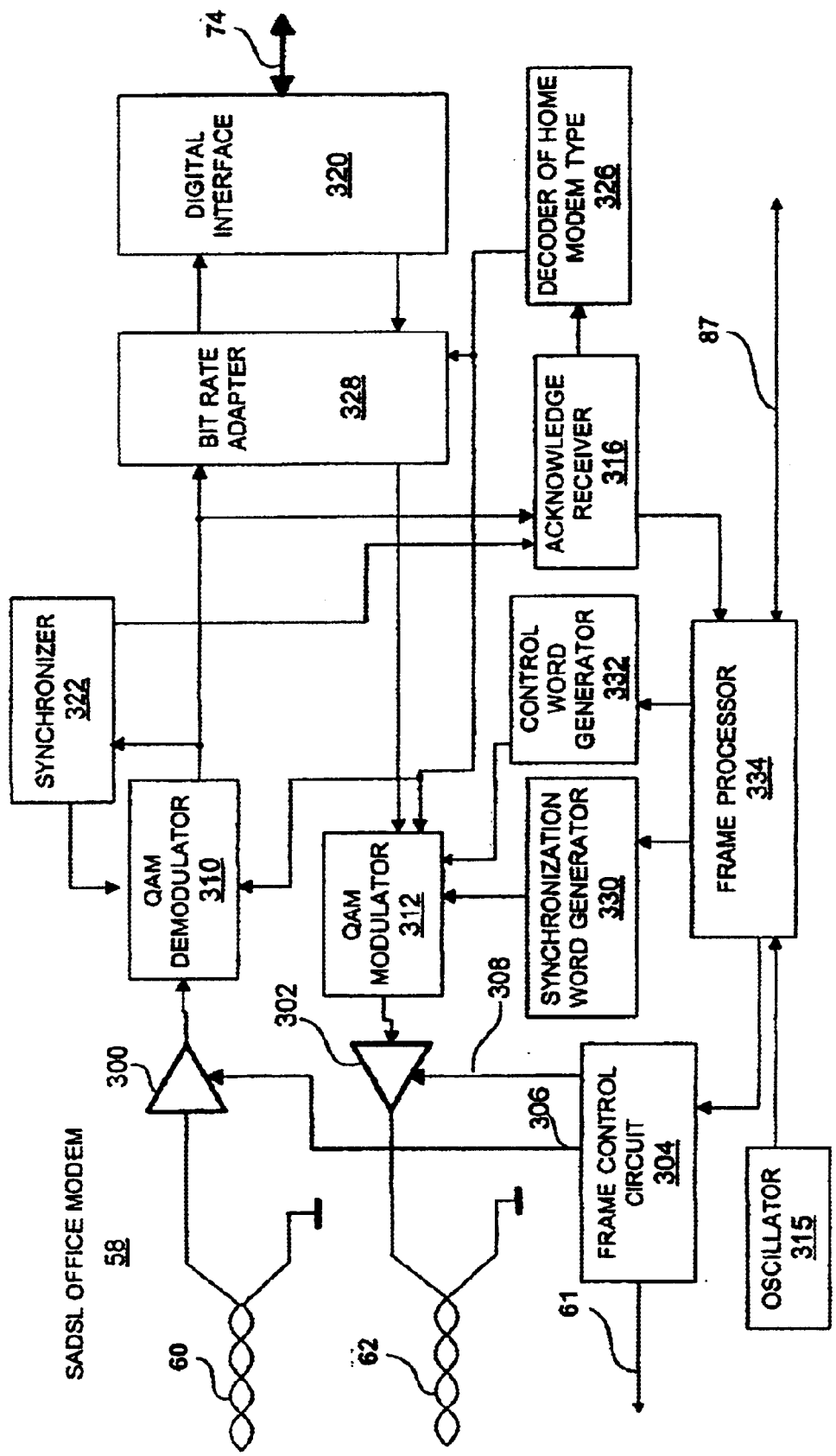
FIG. 13 illustrates in more detail the central office modem.

FIG. 13 illustrates in detail Office Modem 58. Office Modem 58 includes upstream amplifier 300 that is connected to modem up line 60 and downstream amplifier 302 that is connected to modem down line 62. A frame control circuit 304 is coupled to enable input 306 of upstream amplifier 300, to enable input 308 of downstream amplifier 302 and to control line 61. The output of upstream amplifier 300 is connected to the input of QAM demodulator 310 and to the input of downstream amplifier 302, which is connected to the output of QAM modulator 312. The output of QAM demodulator 310 is connected to synchronizer 322, to bit rate adapter 328 and to acknowledge receiver 316. The acknowledge receiver 316 is connected to frame processor 334 and to the decoder of home modem type 326. Frame processor 334 is coupled to the synchronization word generator 330, control word generator 332 and to frame control circuits 304. Frame processor 334 is connected to central office concentrator 56 using service line 87. Synchronization word generator 330 and control word generator 332 are coupled to QAM modulator 312.

Bit rate adapter 328 is coupled to QAM modulator 312, to QAM demodulator 310 and to digital interface 320. Digital interface 320 is coupled to network device 72 using network data line 74. Oscillator 315 is coupled to frame processor 334 and provides the downstream clock.

The upstream signal received from twisted pair 60 is converted by QAM demodulator 310. The binary sequence of the decoded upstream data is transmitted to acknowledge receiver 316, to synchronizer 322 and to bit rate adapter 328.

The bit rate adapter 328 decodes received upstream data transport cells 90 and transmits binary data to digital interface 320. The digital interface 320 provides communication with network device 72. The digital interface 320 supports many different protocols of exchange, such as PCI bus, ISA bus, or any other suitable technology that provides input/output capability to data networks. The synchronizer 322 produces upstream symbol clocks from the received upstream signal.

Acknowledge receiver 316 decodes acknowledges 92, issued from home modem 36 and transmits them to the decoder of home modem type 326 and to frame processor 334.

The decoder of home modem type 326 analyzes the received acknowledge and fixes information about characteristics of home modem 36 that is currently connected to the office modem 58. According to this information, the decoder of home modem type 326 switches bit rate adapter 328, QAM modulator 312 and QAM demodulator 310 to support the corresponding level of modulation: QAM4 or QAM16 or QAM 64 or QAM 256 and the corresponding upstream and downstream data bit rate.

The frame processor 334 provides control signals for synchronization word generator 330, control word generator 332 and for frame control circuit 304. The frame processor 334 analyzes acknowledges 92 that are send by home modem 36 and changes the transmission frame structure as shown in FIG. 2, FIG. 3 and FIG. 4.

Actually the frame structure depends on the information source type connected to home modem 36 in the current communication session. The frame control circuit 304 switches on/off downstream amplifier 302 and upstream amplifier 300, in accordance with commands issued from frame processor 334 and provides upstream repeater frame control signal on control line 61.

Figure 14:
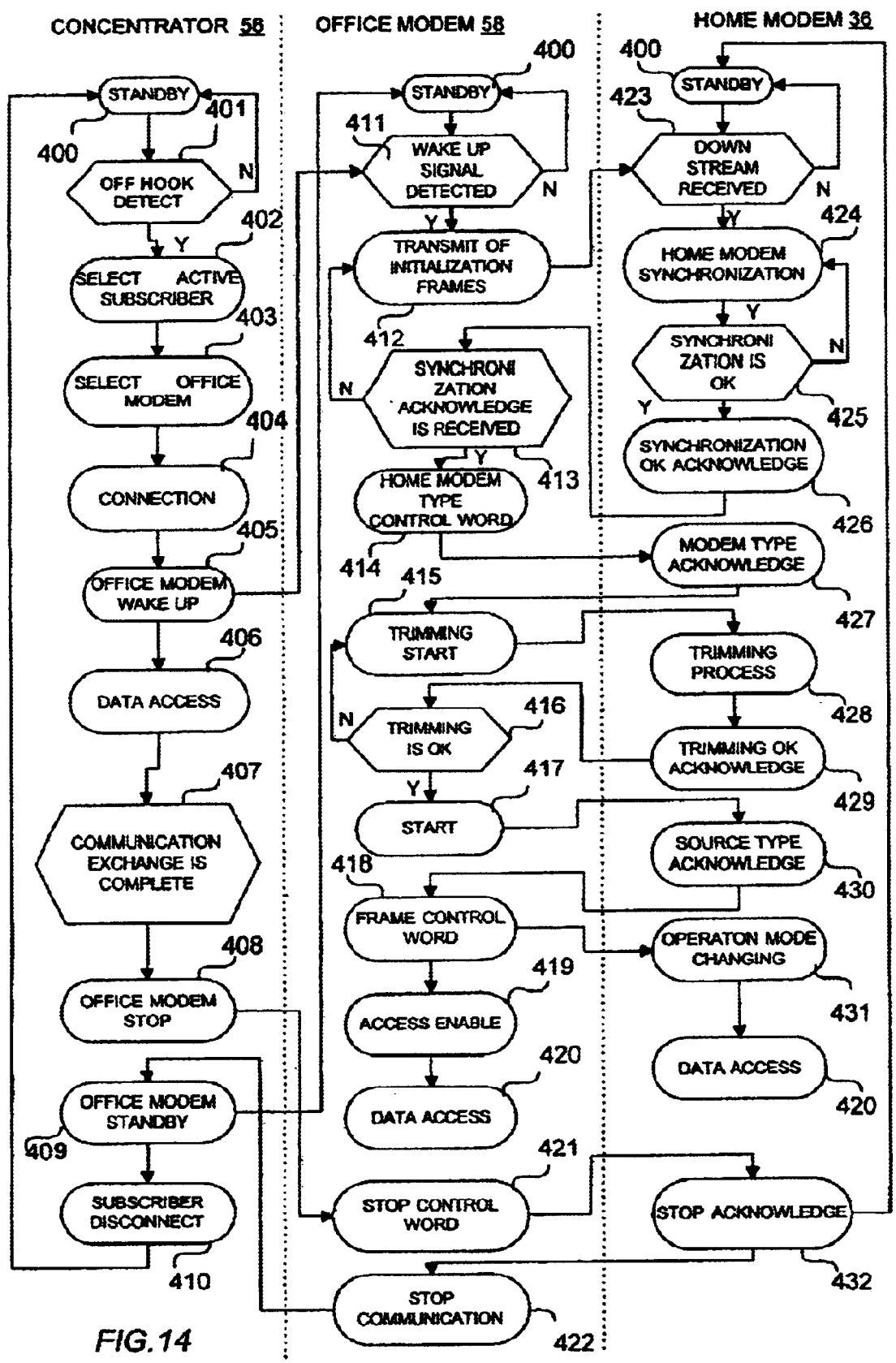
FIG. 14 is a flow chart of a communication system operation.

FIG. 14 is a flow chart that illustrates the operation of SADSL communication system 20 in one embodiment of the present invention. At start-up concentrator 56, home modems 36 and office modems 58 are in standby state (400). The concentrator 56 is waiting for an off-hook detection. Upon detecting a need for data service (401), concentrator 56 selects (402, 403) an active subscriber 22 and an available office modem 58. Concentrator 56 switches its internal relays to make appropriate coupling (404) between the subscriber 22 and the selected office modem 58.

Upon establishing a coupling, the concentrator 56 sends a wake-up signal (405) to selected office modem 58 and transfers office modem 58 to initialization state (411). In this states, office modem 58 begins to operate and sends to home modem 36 sequences of initialization transmission frames (412), corresponding to the symmetrical operation mode (FIG. 4). Initialization transmission frames include synchronization word 88, initialization control word, 89 and idle data transport cells 90. Idle transport cells 90 include a special sequence of QAM or DMT test symbols.

Home modem 36 in standby state (400) is waiting for downstream signal (423) and its frame control circuit 112 to switch on downstream amplifier 106 of home modem 36 and downstream amplifier 206 of downstream repeater 44. During the initialization procedure, synchronizer 110 of home modem 36 trims the downstream and upstream clocks of the home modem 36 to synchronize the transmission frames of the office modem and the home modem (424). After the completion of the synchronization process (425), home modem 36 switches to symmetrical mode operation (FIG. 4) and sends to the office a "synchronization OK" acknowledge (426). Upon decoding this acknowledge (413), office modems 58 switch to "type of home modem detecting" step (414). In this step office modem 58 sends a request to home modem 36 and receives a "modem type" acknowledge (427). The type of home modem decoder 326 analyzes the received acknowledge and switches QAM modulator 312 and QAM demodulator 310 of office modem 58, corresponding to the type of home modem 36 that is connected to office modem 58 in the current communication cycle. At the same time, decoder 326 switches tile characteristics of bit rate adapter 328 to adapt the bit rates of home modem 36 and office modem 58. The next step of the initialization process is trimming (428). It starts upon receiving from the central office a "trimming start" (415) of control word 89. In this step, the gain and the frequency characteristics of downstream amplifier 106 of home modem 36 and upstream amplifier 300 of office modem 58 are trimmed, using QAM or DMT test symbols. Upon completion of the trimming process, home modem 36 sends to the office modem a "trimming OK" acknowledge (429). Upon receiving "trimming OK" acknowledge (416), office modem 58 sends to the home modem the "start" control word (417). In accordance with this command, home modem 36 turns on the information source analyzer 120 that checks which information source (symmetrical, half-asymmetrical or asymmetrical) is waiting for data access. Corresponding to the "source type", acknowledge word 92 is sent to the office modem (430). In accordance with the received "source type" acknowledge, office modem 58 generates a frame control word (418), corresponding to "transmission frame control word" 89. After receiving transmission frame control word 89, every device that is connected to the subscriber line (office modem, home modem, repeaters) changes its transmission frame structure that is produced by frame control circuits, starting from the next frame (431). Upon change of the frame structure, the office modem sends "access enable" control word (419). The next step is an information exchange between the subscriber information source and the network device (420), (406). After the communication exchange is complete (407), concentrator 56 sends to office modem 58 the stop command (408), office modem 58 sends to home modem 36 the "stop control word" (421), home modem 36 returns "stop" acknowledge (432) and home modem 36 turns to the standby state (400). Office modem 58 informs concentrator 56 that the communication session is ended (422). Concentrator 56 puts office modem 58 in stand-by state (409) and disconnects office modem 58 from the corresponding upstream repeater (410).

Figure 15:
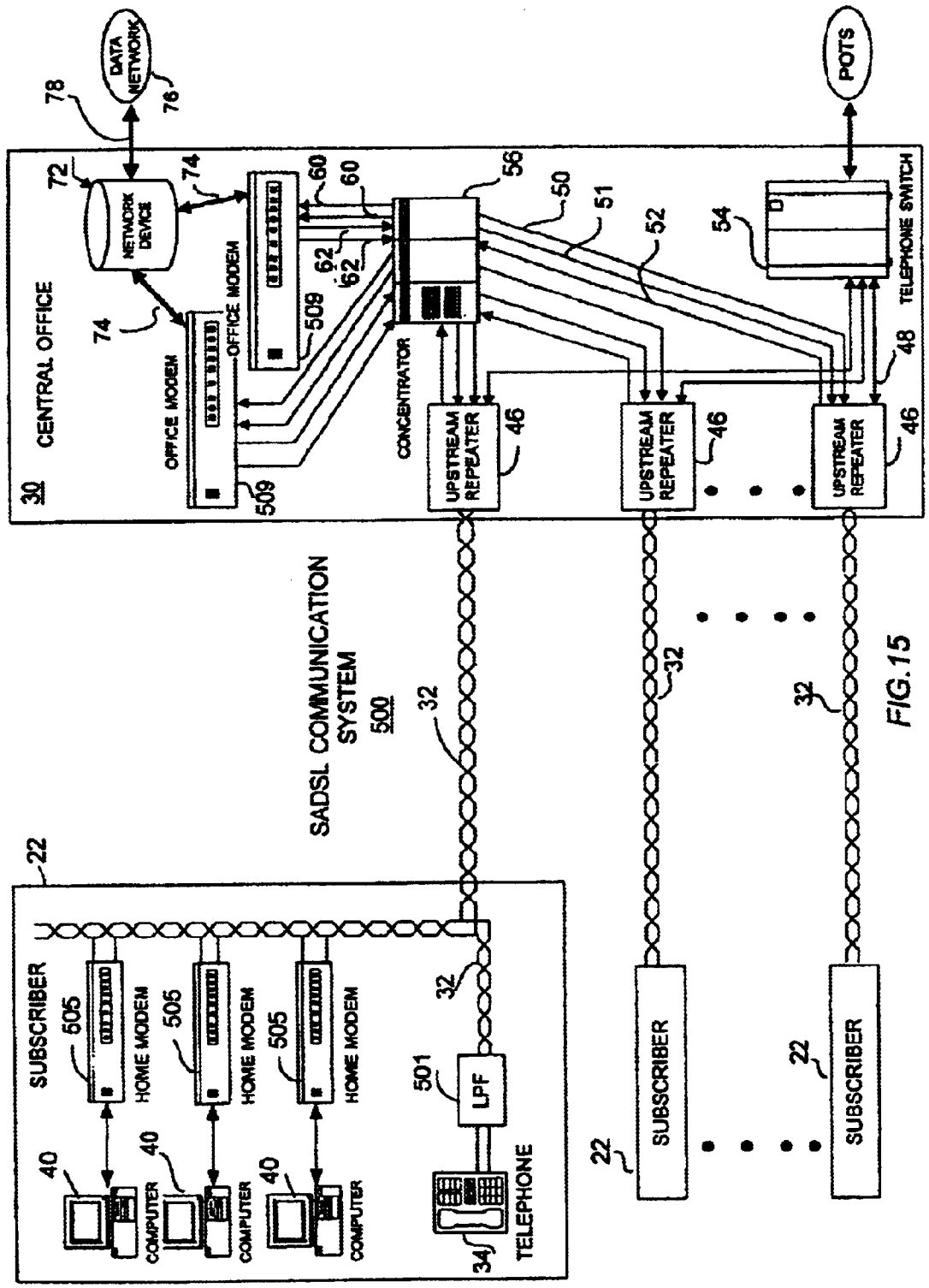
FIG. 15 illustrates how the communication system provides DSL and Home network service simultaneously.

FIG. 15 illustrates a communication system 500 that provides simultaneously telephone, DSL and Home Network service to subscriber 22. A subscriber 22 is coupled Central Office 30 using twisted pair subscriber line 32. Subscriber line 32 supports simultaneously telephone and data service between Central Office 30 and subscriber 22. Subscriber 22 includes a telephone 34 and a number of home modems 505. Telephone 34 is coupled to twisted pair subscriber line 32 by low pass filter 501, that reduces noise in the voice bandwidth. Several home modems 505 are directly connected to subscriber line 32. Every home modem 505 transmits and receives data using QAM or DMT modulation signals. Every home modem 505 is coupled with information source 40 that may be symmetrical, half-asymmetrical or asymmetrical. Home modems 505 connected to the same subscriber line may be of different types and may support one or several levels of line signals as described above. Every home modem 505 may be connected to Central Office 30 or to another home modem 505. Control of communication process is provided by Office modem 509 connected to subscriber line 32 in the current communication cycle. Communication system 500 depicted in FIG. 15 uses the same method as the communication system shown in FIG. 1, but uses more complex transmit framing. This framing comprises a super frame structure that includes a number of transmit frames. Each of the transmit frames can be used independently for communication between different home modems with an office modem or another home modem.

Figure 16:
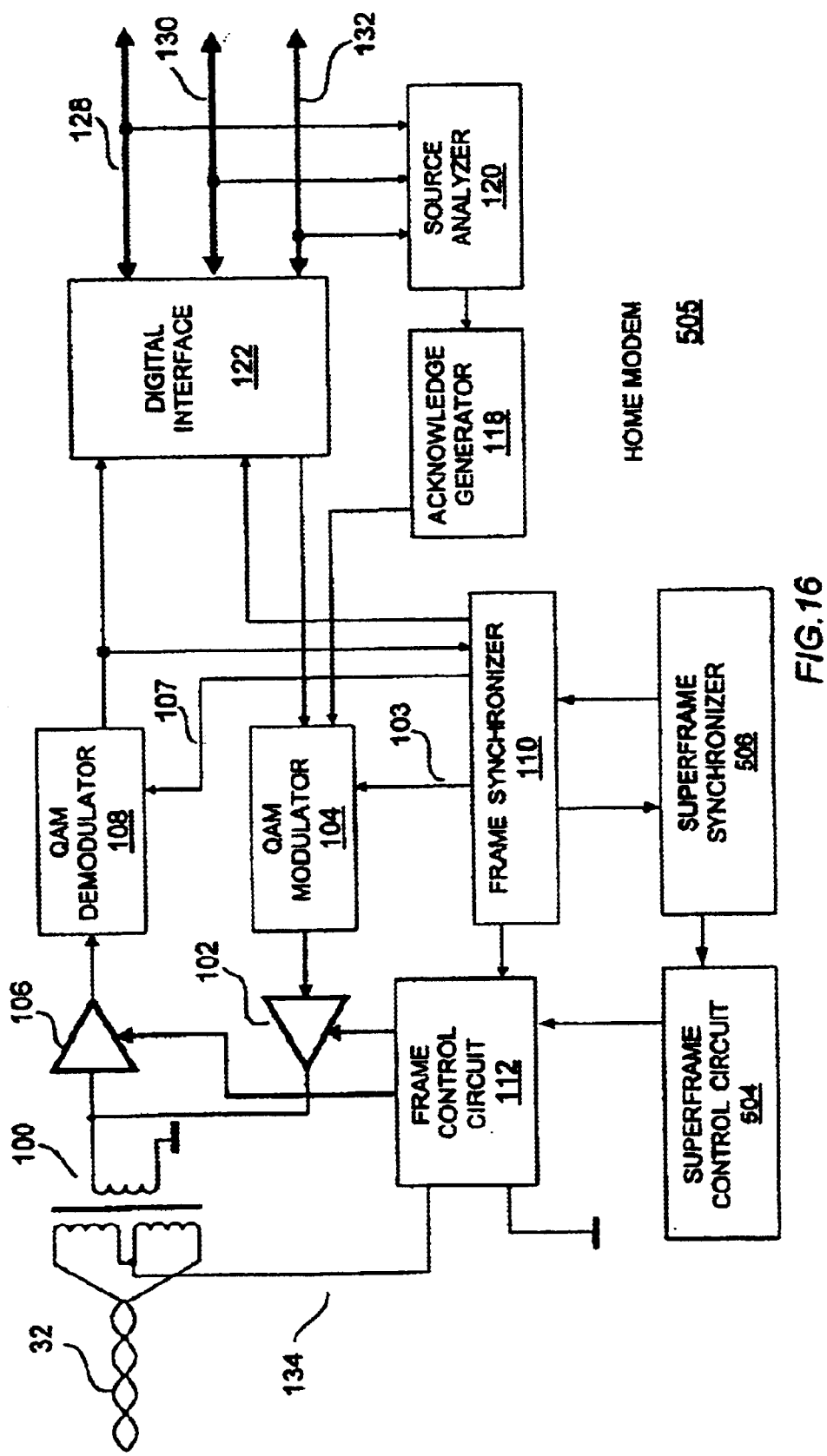
FIG. 16 illustrates in more detail the home modem.

FIG. 16 illustrates, in more detail, home modem 505.

The home modem 505 includes line transformer 100 connected to twisted pair 32, upstream amplifier 102 that is coupled to transformer 100 and to QAM modulator 104, downstream amplifier 106 which is coupled to transformer 100 and to QAM demodulator 108, frame synchronizer 110 coupled to QAM demodulator 108 and to frame control circuit 112, digital interface 122 coupled to QAM modulator and to QAM demodulator 108, and information source analyzer 120 coupled to acknowledge generator 118. Information source analyzer 120 and digital interface 122 are coupled by digital line 128 to symmetrical information source 38 (FIG. 1), by digital line 130 to half asymmetrical information source 40 (FIG. 1) and by digital line 132 to asymmetrical information source 42 (FIG. 1). Acknowledge generator 118 is coupled to QAM modulator 104. Superframe synchronizer 506 is coupled to frame synchronizer 110 and to superframe control circuit 504, that is connected to frame control circuit 112.

Figure 17:
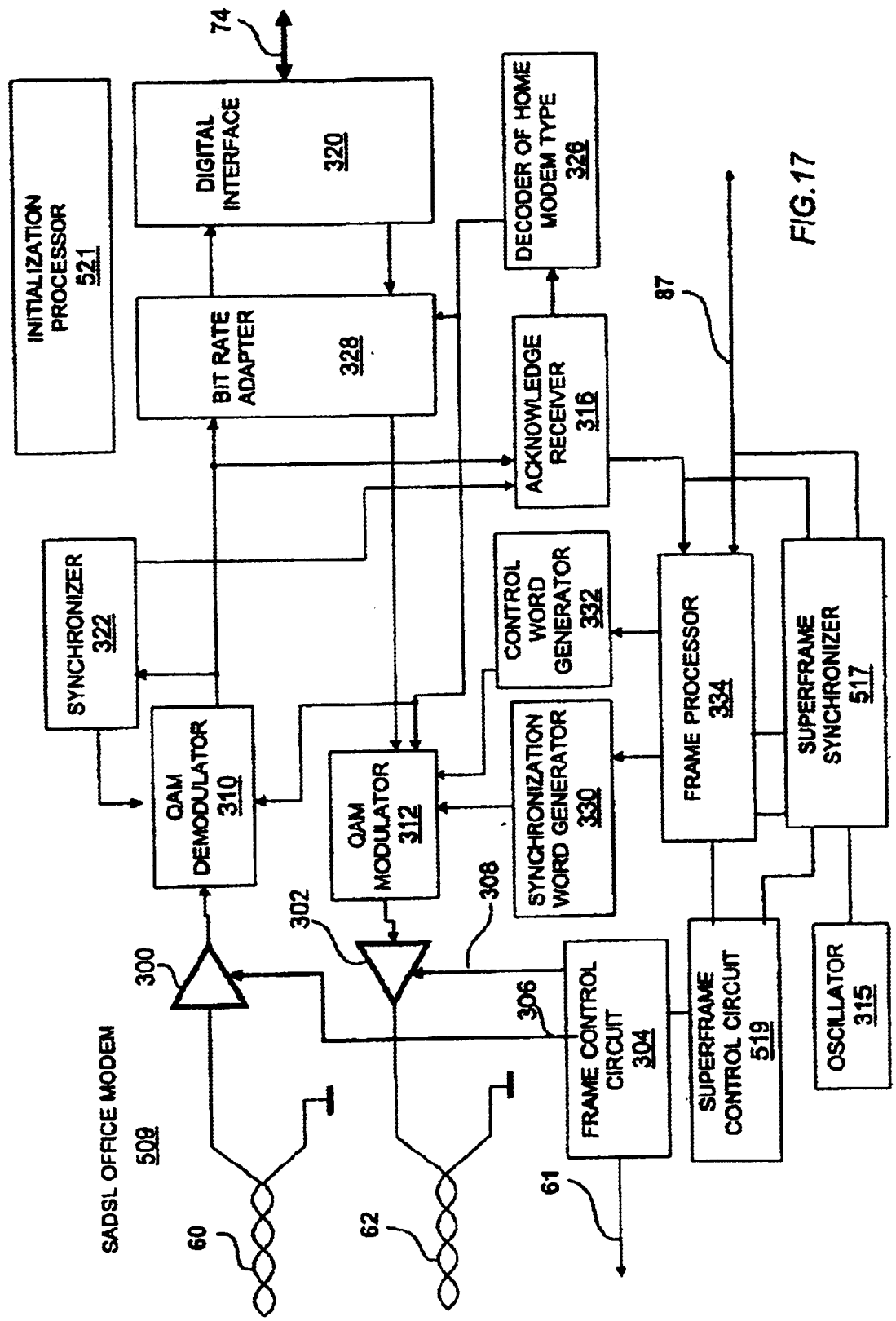
FIG. 17 illustrates in more detail the office modem.

FIG. 17 illustrates in details office modem 509. Office Modem 509 includes upstream amplifier 300 that is connected to modem up line 60 and downstream amplifier 302 that is connected to modem down line 62. A frame control circuit 304 is coupled to enable input 306 of upstream amplifier 300, to enable input 308 of downstream amplifier 302 and to control line 61. The output of upstream amplifier 300 is connected to the input of QAM demodulator 310 and the input of downstream amplifier 302 is connected to the output of QAM modulator 312. The output of QAM demodulator 310 is connected to synchronizer 322, to bit rate adapter 328, and to acknowledge receiver 316. The acknowledges receiver 316 is connected to frame processor 334 and to the decoder of home modem type 326. Frame processor 334 is coupled to synchronization word generator 330, control word generator 332 and to frame control circuits 304. Frame processor 334 is connected to central office concentrator 56, using service line 86. Synchronization word generator 330 and control word generator 332 are coupled to QAM modulator 312. Bit rate adapter 328 is coupled to QAM modulator 312, to QAM demodulator 310 and to digital interface 320. Digital interface 320 is coupled to network device 72 using network data line 74. Oscillator 315 is coupled to frame processor 334 and provides the downstream clock. Superframe synchronizer 517 is coupled to frame processor 334 and to superframe control circuits 519 that is coupled to frame control circuits 304. Office modem 509 includes initialization processor 521 that controls every block of office modem 509 at the beginning of the communication session.

Figure 18:
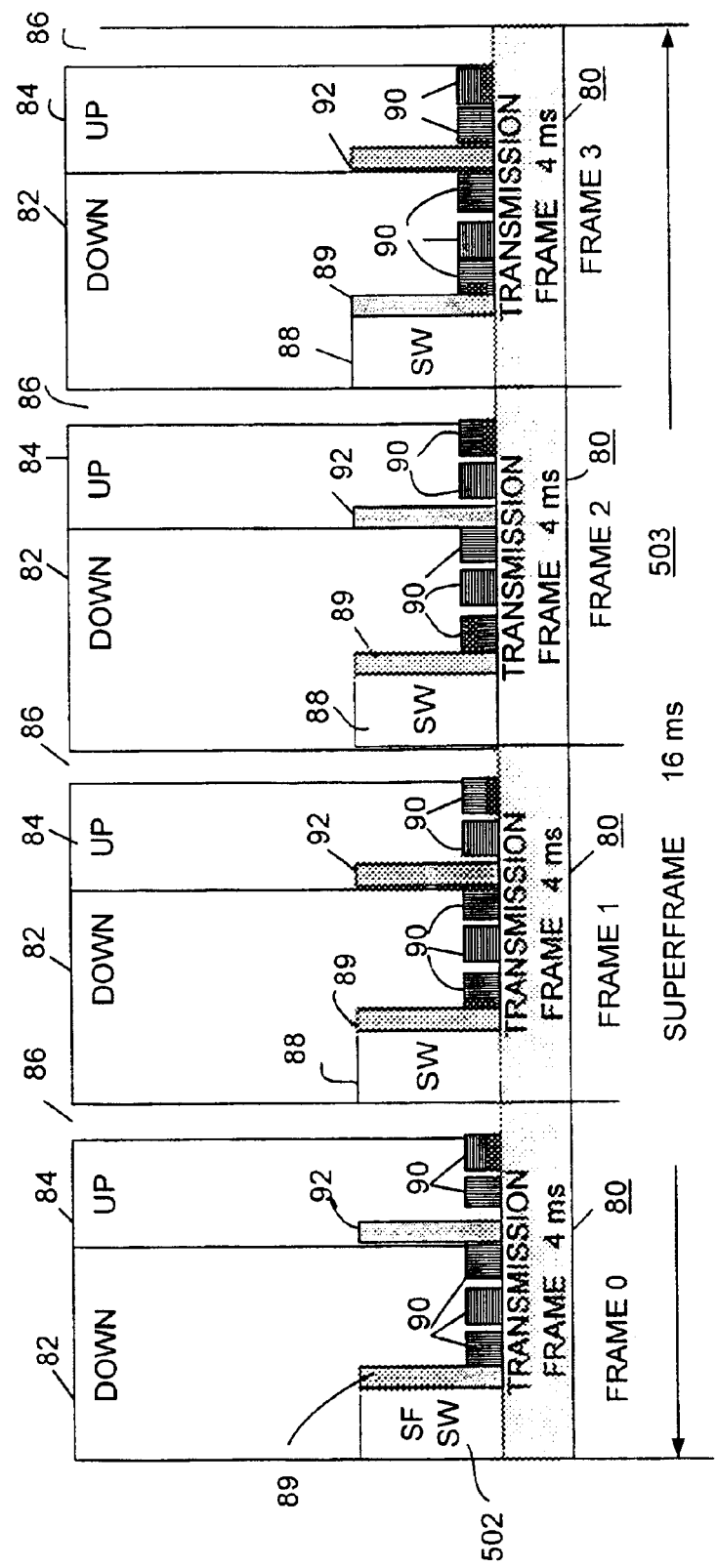
FIG. 18 illustrates transmission superframe structure in the configuration depicted in FIG. 15.

FIG. 18 illustrates the superframe structure. Superframe 503 includes the four transmission frames 80, described above. Transmission frame 80 has a constant ms duration and includes Downstream Interval 82, Upstream Interval 84 and Gap Interval 86. Downstream Interval 82 includes synchronization word (SW) 88, control word (CW) 89 and data transport cells (DTC) 90 that contain downstream data. Upstream Interval 84 includes acknowledge (AK) 92 and data transport cells (DTC) 90 that contain upstream data. Gap Interval (GI) 86 is the guard time for the next transmission frame. Transmission frame 0 has a different synchronization word (SF SW) 502 and is used for superframe synchronization. The superframe has a constant 16 ms duration. Every transmission frame 80 of superframe 503 can be used independently for communication between Office modem 509 and up to 4 active home modems 505 or for communication between up to 8 home modems. In case of communication between home modems (home digital network), one transmission frame 80 services two home modems 505. One of them transmits a QAM or DMT signal during the downstream interval and receives a QAM or DMT signal during the upstream interval. Another home modem 505 transmits a QAM or DMT signal during the upstream interval and receives a QAM or DMT signal during the downstream interval.

Figure 19:
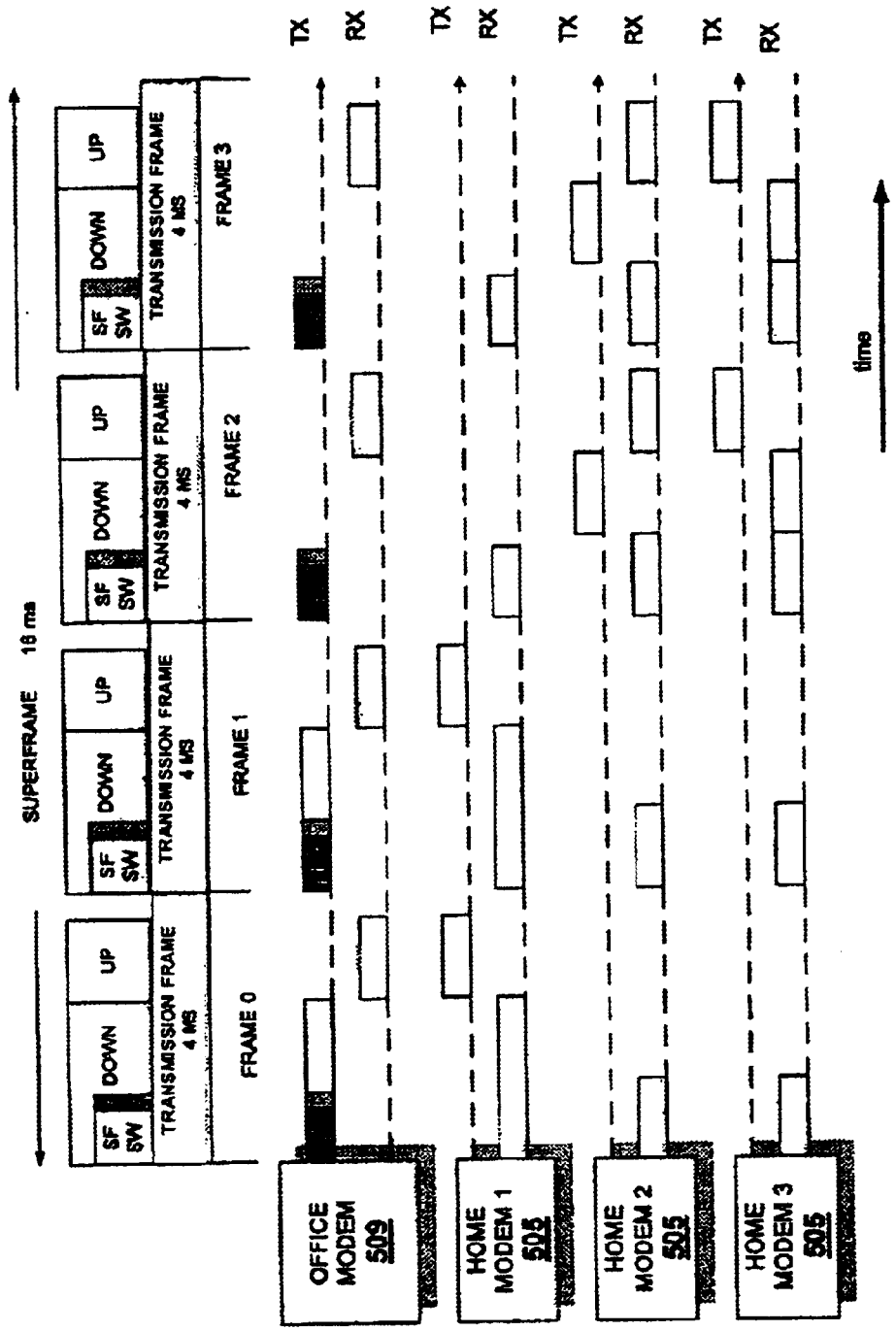
FIG. 19 is a time diagram of the communication system providing DSL and Home Network Service simultaneously.

FIG. 19 is a timing diagram for communication system 500 that provides simultaneously DSL and home digital network service. Office modem 509 operates with superframe 503 and produces synchronization for home modem 1 (505), home modem 2 (505) and home modem 3 (505). Every home modem is connected to the same twisted pair on the subscriber end of the system. Communication system 500 provides DSL service to home modem 1 during Transmission frame 0 and transmission frame 1. During transmission frame 2 and transmission frame 3, communication system 500 provides home digital network service between home modem 2 and home modem 3.

Office modem 509 may be programmed for different assignation of transmission frames 80 to different home modems 505 of the subscriber. Programming of the office modem is performed by initialization of processor 521 at the beginning of the communication session. During this process the office modem, may, for example, analyze the received signal for a detection of the active home modem and the kind of service that the active home modem needs, define which framing structure will be optimal and send to each active home modem information about assignments of this home modem operation mode and transmission frame. The initialization process can be implemented in many versions and it is not detailed in this description of the present invention.

Figure 20:
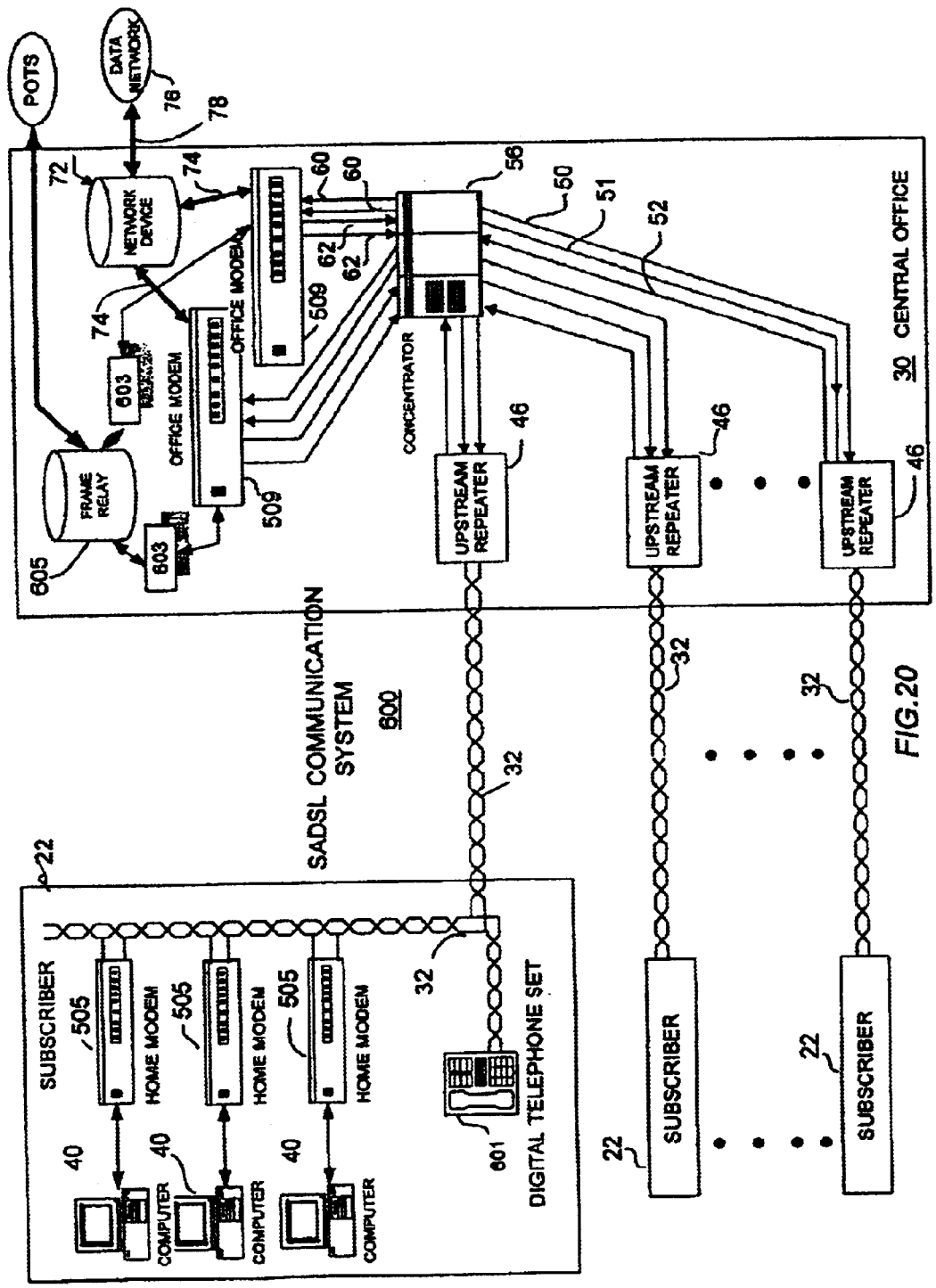
FIG. 20 illustrates the communication system providing DSL, Home Network and digital telephone service simultaneously.

FIG. 20 illustrates a communication system 600 that provides simultaneously digital telephone, DSL and home network services to subscriber 22. A subscriber 22 is coupled to central office 30 using twisted pair subscriber line 32. Subscriber line 32 supports simultaneously digital telephone and data service between central office 30 and subscriber 22. Subscriber 22 includes a digital telephone set 601 and a number of home modems 505. Digital Telephone Set 601 and several home modems 505 are directly connected to subscriber line 32. Every home modem 505 transmits and receives data using QAM or DMT modulated signals. Digital Telephone set 601 transmits and receives voice signals in digital form (after PCM—pulse code modulation or ADM-adaptive data modulation coding) using QAM or DMT line signals. For QAM modulation, voice signals and dialing signals are transmitted during part of the time assigned for synchronization and control signals in the downstream interval and part of the time assigned for the acknowledgement in the upstream interval. For DMT modulation, dialing signals are transmitted in the same way but the voice signal is transmitted during data downstream and upstream intervals on low frequency carriers. Central office 30 of communication system 600 includes PCM or ADM codec 603 connected to office modem 509 and to frame relay 605 of POTS.

Figure 21:
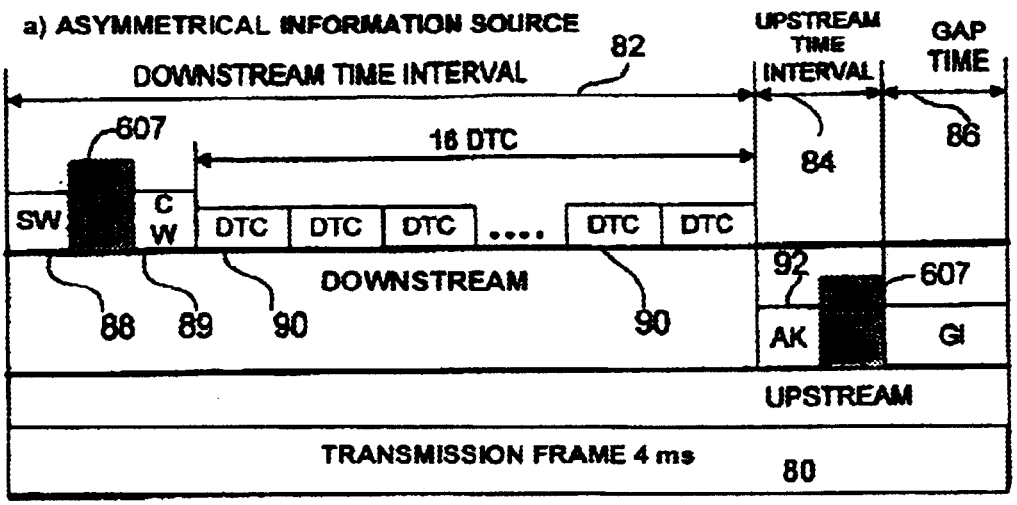
FIG. 21 illustrates transmission of the frame structure of the communication system with digital telephone service in QAM application.
Figure 21:
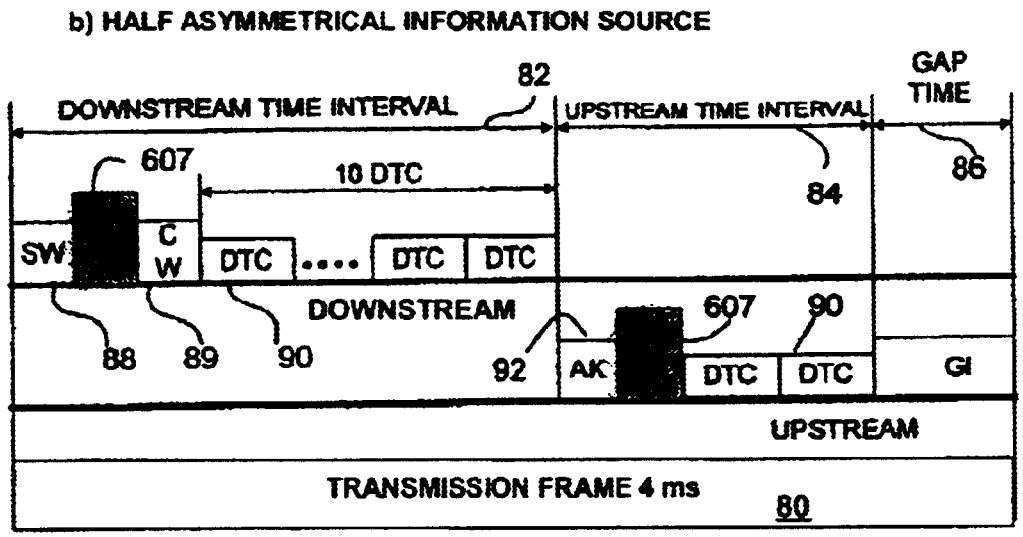
Figure 21:
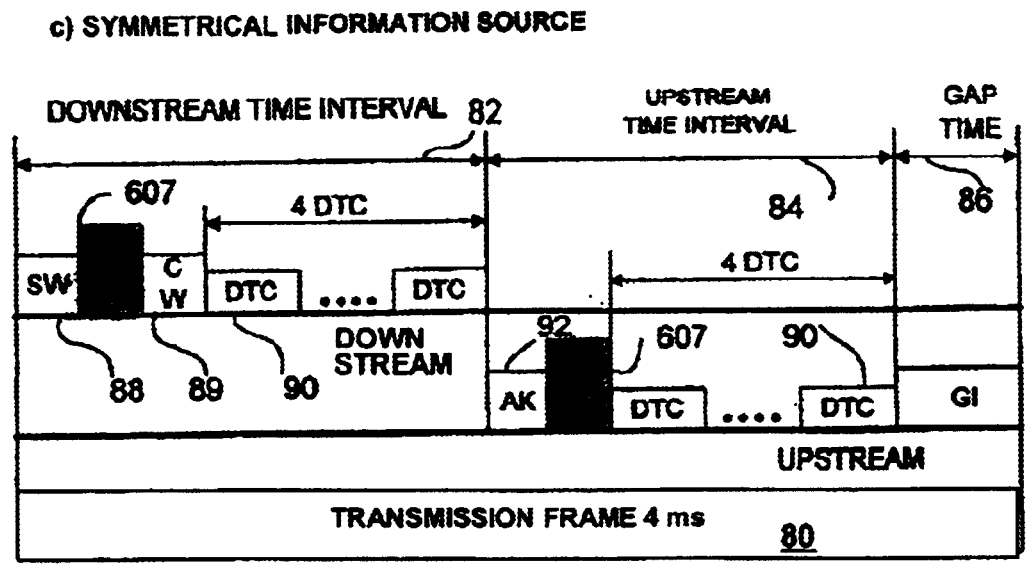

FIG. 21 illustrates the time structure of the transmission frame in the communication system that provides digital telephone service. Upstream and downstream intervals of the transmission frame 80 include telephone code words (V) 607. The telephone code word is used for transmission of voice and dialing signals.

Figure 22:
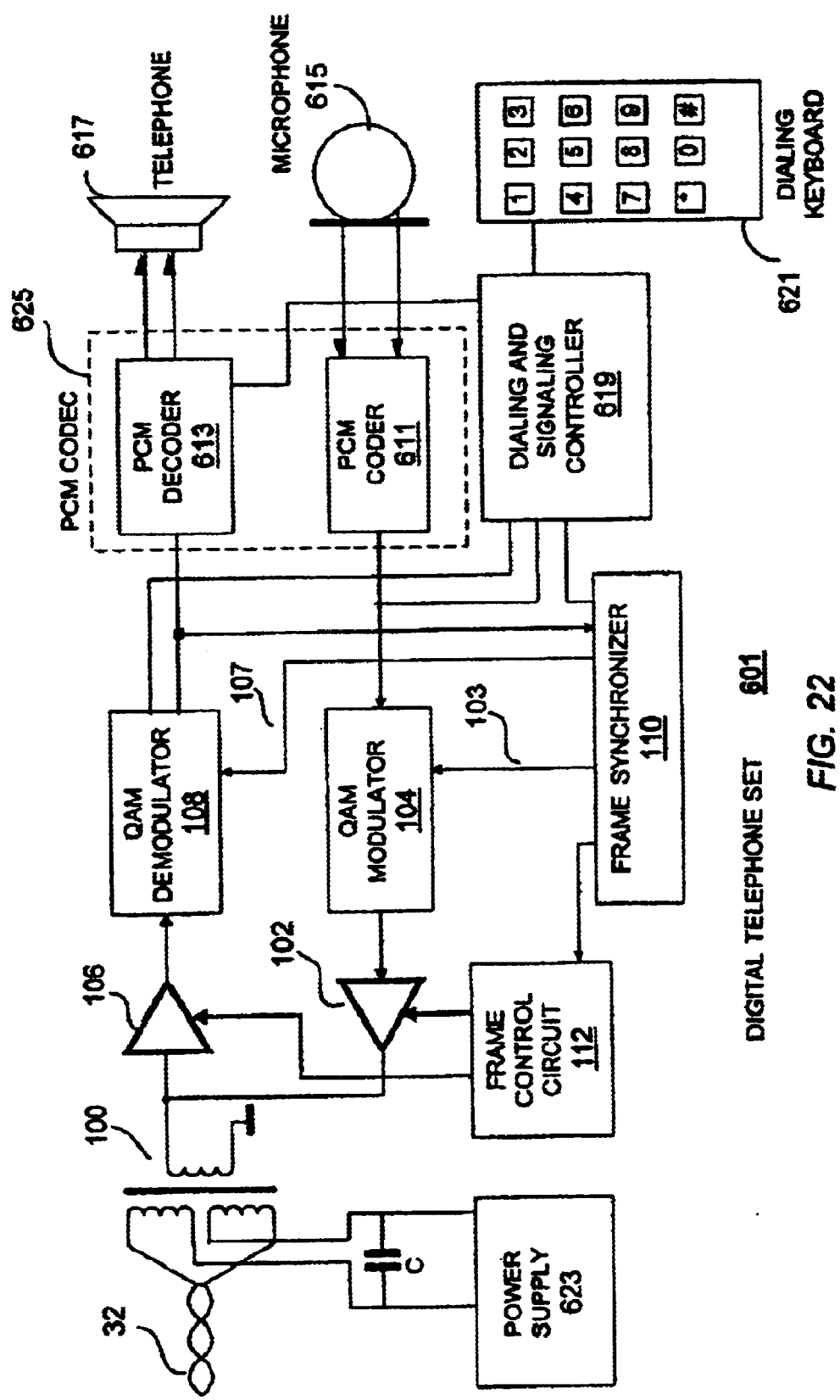
FIG. 22 illustrates in more detail the Digital Telephone Set in QAM application.

FIG. 22 illustrates in more detail the digital telephone set in the QAM application. The digital telephone set 601 includes line transformer 100 connected to twisted pair 32, upstream amplifier 102 that is coupled to transformer 100 and to QAM modulator 104, downstream amplifier 106 which is coupled to transformer 100 and to QAM demodulator 108, frame synchronizer 110 coupled to QAM demodulator 108 and to frame control circuit 112, PCM coder 611 coupled to QAM modulator 104 and PCM decoder 613 coupled to QAM demodulator 108. A microphone 615 is coupled to the input of PCM coder611. A telephone 617 is coupled to the output of PCM decoder 613. Dialing and signaling controller 619 is coupled to QAM modulator 104, QAM demodulators 108, frame synchronizer 110 and to dialing keyboard 621. Power supply 623 is activated only during the off-hook telephone state and supplies power to every block of the digital telephone set 601. Power supply 623 is sourced by the central office like existing analog telephone apparatus. At present, many companies manufacture CMOS integral circuits of a PCM codec 625 that includes PCM coder 611 and PCM decoder 613. These devices are very cheap and consume low power. Frame synchronizer 110, QAM modulator 104, QAM demodulator 108, frame control circuit 112, and dialing and signaling controller 619 can be implemented by means of CMOS ASIC technology. Finally, digital telephone set 601 may comprise only one CMOS IC, that provides all necessary functions for digital voice communication.

Industrial Applicability

The implementation of the present invention is very easy. The SOURCE ADAPTIVE DIGITAL SUBSCRIBER LINE can be implemented on the basis of the existing ADSL system. Nowadays, the technology of ADSL with DMT signals is well known and many worldwide semiconductor companies like Texas Instruments, Analog Devices and Siemens manufacture chip sets for DMT signal processing and analog Front End chips for ADSL Linear Technology, TI. Alcatel, Analog Devices). Most of the digital chips for DMT processing include a DSP that may be programmed to work according to the present method. SADSL is fully compatible with the existing ADSL in its frequency band and transmitted levels. This means that SADSL and existing ADSL can work within the same cable without problems. Moreover, it is possible to design a universal Office Modem that can work with an SADSL or ADSL Home Modem. The simplest SADSL modem can be included within the TV set, video phone or HF audio system and works on the same subscriber line that is connected to the ADSL modem, included into the personal computer. From another point of view, using repeaters can provide an advantage for SADSL in long distance subscriber lines.

Although the present invention has been described within the framework of several embodiments, a myriad of changes, variations, alterations and modifications may be suggested by one skilled in the art, and it is intended that the present invention encompass such changes, variations, alterations and modifications that suit the spirit and scope of the claims detailed hereafter.

What is claimed is:

1. A central office of a digital subscriber line communication system, the central office comprising:
   a telephone switch connectable to a plurality of subscriber lines; and
   at least one office modem, each comprising:
      a modem connectable to a subscriber line; and
      a transmission frame generator to select a type of transmission frame at least in accordance with the type of information source currently active through a home modem connected to said office modem.

2. A central office according to claim 1 wherein said office modem additionally comprises a superframe unit which assigns a different transmission frame of a superframe to each of at least two of said home modems which are connected to said subscriber line.

3. A central office according to claim 1 wherein said office modem comprises a programming unit which programs each of at least two of said home modems which are connected to said subscriber line for communication with said central office modem or with another home modem.

4. A central office according to claim 1 wherein said office modem additionally comprises means for communicating with a digital telephone set connected to said subscriber line.

5. A central office according to claim 1 and also comprising a plurality of upstream repeaters coupled to twisted pair subscriber lines, each said upstream repeater comprising a unit which splits one said twisted pair subscriber line into a downstream data line, an upstream data line and a phone line.

6. An office transmission unit of a digital subscriber line communication system, the unit comprising:
   a modem connectable to a subscriber line; and
      a transmission frame generator to select a type of transmission frame at least in accordance with the type of information source currently active through a home modem connected to said office transmission unit.

7. A unit according to claim 6 wherein said office modem additionally comprises a superframe unit which assigns a different transmission frame of a superframe to each of at least two of said home modems which are connected to said subscriber line.

8. A unit according to claim 6 wherein said office modem comprises a programming unit which programs each of at least two of said home modems which are connected to said subscriber line for communication with said central office modem or with another home modem.

9. A unit according to claim 6 wherein said office modem additionally comprises means for communicating with a digital telephone set connected to said subscriber line.

10. A home modem of a digital subscriber line communication system, said home modem comprising:
    a housing connectable to a plurality of information sources, said information sources being formed of the group comprising: asymmetrical information sources, symmetrical information sources and half-asymmetrical information sources; and
    a transmission frame generator to select a type of transmission frame at least in accordance with the type of information source currently connected to said housing.

11. A modem according to claim 10 and also comprising a home superframe unit which processes a transmission frame assigned to it by an office superframe unit.

12. A method for communication along telephone cables in a digital subscriber line communication system, the method comprising:
    selecting a transmission frame structure depending on the type of information source that is connected to a subscriber line in a current communication session.

13. A method according to claim 12 wherein said frame structure has a fixed duration, divided into a downstream interval, an upstream interval and a gap interval and wherein the number of data transport cells in said downstream and upstream intervals depends on said type of information source.

14. A method according to claim 13 and wherein there are no data transport cells in the upstream interval for asymmetric information sources.

15. A method according to claim 13 and wherein there are fewer data transport cells in the upstream interval than in the downstream interval for half-asymmetric information sources.

16. A method according to claim 13 and wherein there are an equivalent number of data transport cells in the upstream and downstream intervals for symmetric information sources.

17. A method according to claim 12 and further comprising:

packing a number of transmission frames into a superframe;

assigning transmission frames of a superframe to different communication channels;

assigning to each communication channel two communication devices; and sequential transmission of a number of transmission frames included into a superframe.

18. A method according to claim 13 and further comprising selecting the modulation of a data transport cell in accordance with the type of home modem that is connected to a subscriber line in said current communication session.

19. A method according to claim 12 and further comprising controlling of devices connected to a subscriber line by a control word of a downstream line signal.

* * * * *